United States Patent
Mixter et al.

(10) Patent No.: US 9,812,128 B2
(45) Date of Patent: Nov. 7, 2017

(54) DEVICE LEADERSHIP NEGOTIATION AMONG VOICE INTERFACE DEVICES

(71) Applicant: GOOGLE INC., Mountain View, CA (US)

(72) Inventors: Kenneth Mixter, Los Altos Hills, CA (US); Diego Melendo Casado, Mountain View, CA (US); Alexander Houston Gruenstein, Mountain View, CA (US); Terry Tai, New York, NY (US); Christopher Thaddeus Hughes, Redwood City, CA (US); Matthew Nirvan Sharifi, Kilchberg (CH)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 15/284,483

(22) Filed: Oct. 3, 2016

(65) Prior Publication Data

US 2017/0025124 A1    Jan. 26, 2017

Related U.S. Application Data

(63) Continuation-in-part of application No. 15/088,477, filed on Apr. 1, 2016, now Pat. No. 9,514,752, which (Continued)

(51) Int. Cl.
*G10L 15/00* (2013.01)
*G10L 15/22* (2006.01)
(Continued)

(52) U.S. Cl.
CPC .............. *G10L 15/22* (2013.01); *G10L 15/32* (2013.01); *G10L 25/60* (2013.01); *G10L 2015/088* (2013.01); *G10L 2015/223* (2013.01)

(58) Field of Classification Search
USPC .................................. 704/231–257, 270–275
See application file for complete search history.

(56) References Cited

U.S. PATENT DOCUMENTS 4,363,102 A    12/1982    Holmgren
5,659,665 A     8/1997    Whelpley, Jr.
(Continued)

FOREIGN PATENT DOCUMENTS

WO    WO/9840875 A1    9/1998

OTHER PUBLICATIONS

International Search Report and Written Opinion in International App. No. PCT/US2015/052860, dated Dec. 8, 2015, 12 pgs.

*Primary Examiner* — Jesse Pullias
(74) *Attorney, Agent, or Firm* — Morgan, Lewis & Bockius LLP

(57) ABSTRACT

A method at a first electronic device of multiple electronic devices, each electronic device of the plurality of electronic devices including one or more microphones and a speaker, includes detecting a voice input; determining a quality score for the detected voice input; communicating the quality score to the other devices of the plurality of electronic devices; receiving quality scores generated by the other devices for detection of the voice input by the other devices; if the quality score generated by the first electronic device is the highest amongst the quality scores, outputting an audible and/or visual response to the detected voice input, where the other devices of the plurality of electronic devices forgo outputting an audible response to the detected voice input; and if the quality score generated by the first electronic device is not the highest amongst the quality scores, forgoing outputting a response to the detected voice input.

15 Claims, 10 Drawing Sheets
(1 of 10 Drawing Sheet(s) Filed in Color)

Related U.S. Application Data is a continuation of application No. 14/675,932, filed on Apr. 1, 2015, now Pat. No. 9,318,107.

(60) Provisional application No. 62/061,830, filed on Oct. 9, 2014.

(51) Int. Cl.
*G10L 15/32* (2013.01)
*G10L 15/08* (2006.01)
*G10L 25/60* (2013.01)

(56) References Cited

U.S. PATENT DOCUMENTS

| | | | |
|---|---|---|---|
| 5,897,616 A | 4/1999 | Kanevsky | |
| 6,671,672 B1* | 12/2003 | Heck | G10L 17/24 704/273 |
| 6,744,860 B1 | 6/2004 | Schrage | |
| 6,826,159 B1 | 11/2004 | Shaffer et al. | |
| 6,931,375 B1 | 8/2005 | Bossemeyer | |
| 6,973,426 B1 | 12/2005 | Schier | |
| 7,016,833 B2 | 3/2006 | Gable | |
| 7,222,072 B2* | 5/2007 | Chang | G10L 17/22 704/249 |
| 7,720,012 B1 | 5/2010 | Borah | |
| 7,904,297 B2* | 3/2011 | Mirkovic | G06F 17/28 704/235 |
| 8,099,288 B2 | 1/2012 | Zhang | |
| 8,209,174 B2 | 6/2012 | Al-Telmissani | |
| 8,340,975 B1* | 12/2012 | Rosenberger | G10L 15/22 704/270 |
| 8,717,949 B2 | 5/2014 | Crinon | |
| 8,719,018 B2 | 5/2014 | Dinerstein | |
| 8,768,687 B1* | 7/2014 | Quasthoff | G10L 15/26 379/142.14 |
| 8,775,191 B1 | 7/2014 | Sharifi et al. | |
| 8,996,372 B1* | 3/2015 | Secker-Walker | G10L 15/34 704/231 |
| 9,142,218 B2* | 9/2015 | Schroeter | G10L 17/20 |
| 2002/0049596 A1* | 4/2002 | Burchard | G10L 15/22 704/270 |
| 2002/0072905 A1* | 6/2002 | White | G10L 15/30 704/231 |
| 2002/0123890 A1 | 9/2002 | Kopp et al. | |
| 2002/0193991 A1* | 12/2002 | Bennett | G10L 15/32 704/247 |
| 2003/0200090 A1 | 10/2003 | Kawazoe | |
| 2003/0231746 A1 | 12/2003 | Hunter | |
| 2004/0101112 A1* | 5/2004 | Kuo | H04M 1/67 379/88.01 |
| 2005/0165607 A1* | 7/2005 | Di Fabbrizio | G06F 17/2785 704/256 |
| 2006/0074656 A1* | 4/2006 | Mathias | G10L 15/063 704/243 |
| 2006/0184370 A1* | 8/2006 | Kwak | G10L 15/1822 704/275 |
| 2007/0100620 A1* | 5/2007 | Tavares | G10L 17/06 704/246 |
| 2007/0198262 A1 | 8/2007 | Mindlin | |
| 2009/0258333 A1 | 10/2009 | Yu | |
| 2009/0292541 A1* | 11/2009 | Daya | G10L 15/063 704/251 |
| 2010/0070276 A1* | 3/2010 | Wasserblat | H04M 3/5232 704/243 |
| 2010/0110834 A1* | 5/2010 | Kim | G01S 3/8083 367/124 |
| 2011/0026722 A1 | 2/2011 | Jing et al. | |
| 2011/0054892 A1 | 3/2011 | Jung et al. | |
| 2011/0060587 A1* | 3/2011 | Phillips | G10L 15/30 704/235 |
| 2011/0066429 A1 | 3/2011 | Shperling et al. | |
| 2012/0084087 A1 | 4/2012 | Yang | |
| 2012/0232896 A1* | 9/2012 | Taleb | G10L 25/78 704/233 |
| 2012/0265528 A1* | 10/2012 | Gruber | G10L 15/18 704/235 |
| 2013/0060571 A1* | 3/2013 | Soemo | G10L 15/30 704/251 |
| 2013/0132086 A1* | 5/2013 | Xu | G10L 15/01 704/257 |
| 2013/0183944 A1* | 7/2013 | Mozer | H04L 12/282 455/414.1 |
| 2014/0012573 A1* | 1/2014 | Hung | G06F 1/3215 704/233 |
| 2014/0088961 A1* | 3/2014 | Woodward | G10L 15/22 704/235 |
| 2014/0222430 A1 | 8/2014 | Rao | |
| 2014/0257821 A1* | 9/2014 | Adams | G10L 25/93 704/275 |
| 2014/0278383 A1 | 9/2014 | Fan | |
| 2014/0278435 A1* | 9/2014 | Ganong, III | G10L 15/22 704/275 |
| 2015/0154953 A1 | 6/2015 | Bapat et al. | |
| 2015/0262577 A1 | 9/2015 | Nomura | |

* cited by examiner

Motion Sketches

| Breathing / Pulsing | Flickering | Blinking | Swiping | Rotating | Rotating |
|---|---|---|---|---|---|
|  |  |  |  |  |  |
| (1) | (3) | (5) | (6) | (7) | (9) |
|  |  |  |  |  | |
| (2) | (4) | | | (8) | (10) |

DEVICE LEADERSHIP NEGOTIATION AMONG VOICE INTERFACE DEVICES

RELATED APPLICATIONS

This application is a continuation-in-part of U.S. patent application Ser. No. 15/088,477, titled "Hotword Detection on Multiple Devices," filed Apr. 1, 2016, which is a continuation of U.S. patent application Ser. No. 14/675,932, titled "Hotword Detection on Multiple Devices," filed Apr. 1, 2015, now U.S. Pat. No. 9,318,107, which claims the benefit of U.S. Provisional Application No. 62/061,830, titled "Hotword Detection on Multiple Devices," filed Oct. 9, 2014, all of which are incorporated by reference herein in their entirety.

This application is related to the following applications, which are incorporated by reference herein in their entirety:

U.S. Provisional Patent Application No. 62/334,434, entitled "Implementations for Voice Assistant on Devices," filed May 10, 2016; and U.S. Provisional Patent Application No. 62/336,566, entitled "LED Design Language for Visual Affordance of Voice User Interfaces," filed May 13, 2016.

TECHNICAL FIELD

The disclosed implementations relates generally to voice interfaces and related devices, including but not limited to methods and systems for coordination amongst multiple voice interface devices.

BACKGROUND

Electronic devices integrated with microphones have been widely used to collect voice inputs from users and implement voice-activated functions according to the voice inputs. For example, many state-of-the-art mobile devices include a voice assistant feature (e.g., Siri, Google Assistant) that is configured to use voice inputs to initiate a phone call, conduct a restaurant search, start routing on a map, create calendar events, add a post to a social network, recognize a song, and complete many other tasks.

A location (e.g., a room or space within a home) may include multiple devices that include voice assistant systems and one or more users of such devices. As the devices are more than ever configured to be capable of accessing and presenting user-specific information, it is desirable for a voice assistant device to be able to handle multiple users gracefully and be able to provide user-specific information to the appropriate user. It is also desirable for there to be a leader amongst the voice assistant devices that is responsible for responding to the user's voice inputs, in order to reduce user confusion. Further, it is desirable for a voice assistant device to include noise mitigation measures in case the voice assistant devices are located at a noisy location.

SUMMARY

Accordingly, there is a need for an electronic device with a voice assistant system and/or a voice assistant server system that incorporates methods and systems for handling multiple users, for multi-device coordination to determine a leader, and for noise mitigation. The device and/or the server system may be configured to identify a speaker of a voice input based on comparisons to voice models, and to personalize responses to the identified speaker. The device and/or the server system may also be configured to negotiate leadership amongst multiple devices for response to a speaker. The device and/or the server system may further be configured to detect that an environment around the device is sufficiently noisy where an alternative method, to a hotword voice input, of waking up the device is advisable.

In accordance with some implementations, a method includes, at an electronic device with one or more microphones, a speaker, one or more processors, and memory storing one or more programs for execution by the one or more processors: receiving a first freeform voice input, comparing the first voice input to a set of voice models associated with a plurality of users associated with the electronic device, where the voice models are trained to the electronic device, based on the comparing, determining that the first voice input corresponds to a first user of the plurality of users, and presenting a response in accordance with the determination.

In some implementations, an electronic device includes one or more microphones, a speaker, one or more processors, and memory storing one or more programs for execution by the one or more processors. The one or more programs include instructions for: receiving a first freeform voice input, comparing the first voice input to a set of voice models associated with a plurality of users associated with the electronic device, where the voice models are trained to the electronic device, based on the comparing, determining that the first voice input corresponds to a first user of the plurality of users, and presenting a response in accordance with the determination.

In some implementations, a non-transitory computer readable storage medium stores one or more programs. The one or more programs include instructions, which, when executed by an electronic device with one or more microphones, a speaker, and one or more processors, cause the electronic device to perform operations including: receiving a first freeform voice input, comparing the first voice input to a set of voice models associated with a plurality of users associated with the electronic device, where the voice models are trained to the electronic device, based on the comparing, determining that the first voice input corresponds to a first user of the plurality of users, and presenting a response in accordance with the determination.

In accordance with some implementations, a method includes, at a first electronic device of a plurality of electronic devices, each electronic device of the plurality of electronic devices comprising one or more microphones, a speaker, one or more processors, and memory storing one or more programs for execution by the one or more processors: detecting a voice input, determining a quality score for the detected voice input, communicating the quality score to the other devices of the plurality of electronic devices, receiving quality scores generated by the other devices of the plurality of electronic devices for detection of the voice input by the other devices, in accordance with a determination that the quality score generated by the first electronic device is the highest amongst the generated quality score and received quality scores for the voice input, outputting an audible and/or a visual response to the detected voice input, where the other devices of the plurality of electronic devices forgo outputting an audible response to the detected voice input, and in accordance with a determination that the quality score generated by the first electronic device is not the highest amongst the quality scores for the voice input generated by the plurality of electronic devices, forgoing outputting a response to the detected voice input.

In accordance with some implementations, a first electronic device of a plurality of electronic devices includes, and each of the plurality of electronic devices includes, one or more microphones, a speaker, one or more processors, and memory storing one or more programs to be executed by the one or more processors. The one or more programs include instructions for: detecting a voice input; determining a quality score for the detected voice input; communicating the quality score to the other devices of the plurality of electronic devices; receiving quality scores generated by the other devices of the plurality of electronic devices for detection of the voice input by the other devices; in accordance with a determination that the quality score generated by the first electronic device is the highest amongst the generated quality score and received quality scores for the voice input, outputting an audible and/or a visual response to the detected voice input, where the other devices of the plurality of electronic devices forgo outputting an audible response to the detected voice input; and in accordance with a determination that the quality score generated by the first electronic device is not the highest amongst the quality scores for the voice input generated by the plurality of electronic devices, forgoing outputting a response to the detected voice input.

In accordance with some implementations, a non-transitory computer readable storage medium stores one or more programs. The one or more programs include instructions, which, when executed by a first electronic device of a plurality of electronic devices, each of the plurality of electronic device comprising one or more microphones, a speaker, and one or more processors, cause the electronic device to perform operations including: detecting a voice input; determining a quality score for the detected voice input; communicating the quality score to the other devices of the plurality of electronic devices; receiving quality scores generated by the other devices of the plurality of electronic devices for detection of the voice input by the other devices; in accordance with a determination that the quality score generated by the first electronic device is the highest amongst the generated quality score and received quality scores for the voice input, outputting an audible and/or a visual response to the detected voice input, where the other devices of the plurality of electronic devices forgo outputting an audible response to the detected voice input; and in accordance with a determination that the quality score generated by the first electronic device is not the highest amongst the quality scores for the voice input generated by the plurality of electronic devices, forgoing outputting a response to the detected voice input.

In some implementations, a method includes, at an electronic device with one or more microphones, a speaker, one or more processors, and memory storing one or more programs for execution by the one or more processors, the electronic device configured to be awakened by any of a plurality of affordances including a voice-based affordance: determining a noise profile of an environment around the electronic device; determining whether the noise profile interferes with the voice-based affordance; and in accordance with a determination that the noise profile interferes with the voice-based affordance, presenting a hint to a user to use an affordance of the plurality of affordances other than the voice-based affordance to awaken the electronic device.

In some implementations, an electronic device includes one or more microphones, a speaker, one or more processors, and memory storing one or more programs to be executed by the one or more processors. The electronic device is configured to be awakened by any of a plurality of affordances including a voice-based affordance. The one or more programs include instructions for: determining a noise profile of an environment around the electronic device, determining whether the noise profile interferes with the voice-based affordance, and in accordance with a determination that the noise profile interferes with the voice-based affordance, presenting a hint to a user to use an affordance of the plurality of affordances other than the voice-based affordance to awaken the electronic device.

A non-transitory computer readable storage medium stores one or more programs. The one or more programs include instructions, which, when executed by an electronic device with one or more microphones, a speaker, and one or more processors, the electronic device configured to be awakened by any of a plurality of affordances including a voice-based affordance, cause the electronic device to perform operations including: determining a noise profile of an environment around the electronic device, determining whether the noise profile interferes with the voice-based affordance, and in accordance with a determination that the noise profile interferes with the voice-based affordance, presenting a hint to a user to use an affordance of the plurality of affordances other than the voice-based affordance to awaken the electronic device.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a better understanding of the various described implementations, reference should be made to the Description of Implementations below, in conjunction with the following drawings in which like reference numerals refer to corresponding parts throughout the figures.

DESCRIPTION OF IMPLEMENTATIONS

Figure 1:
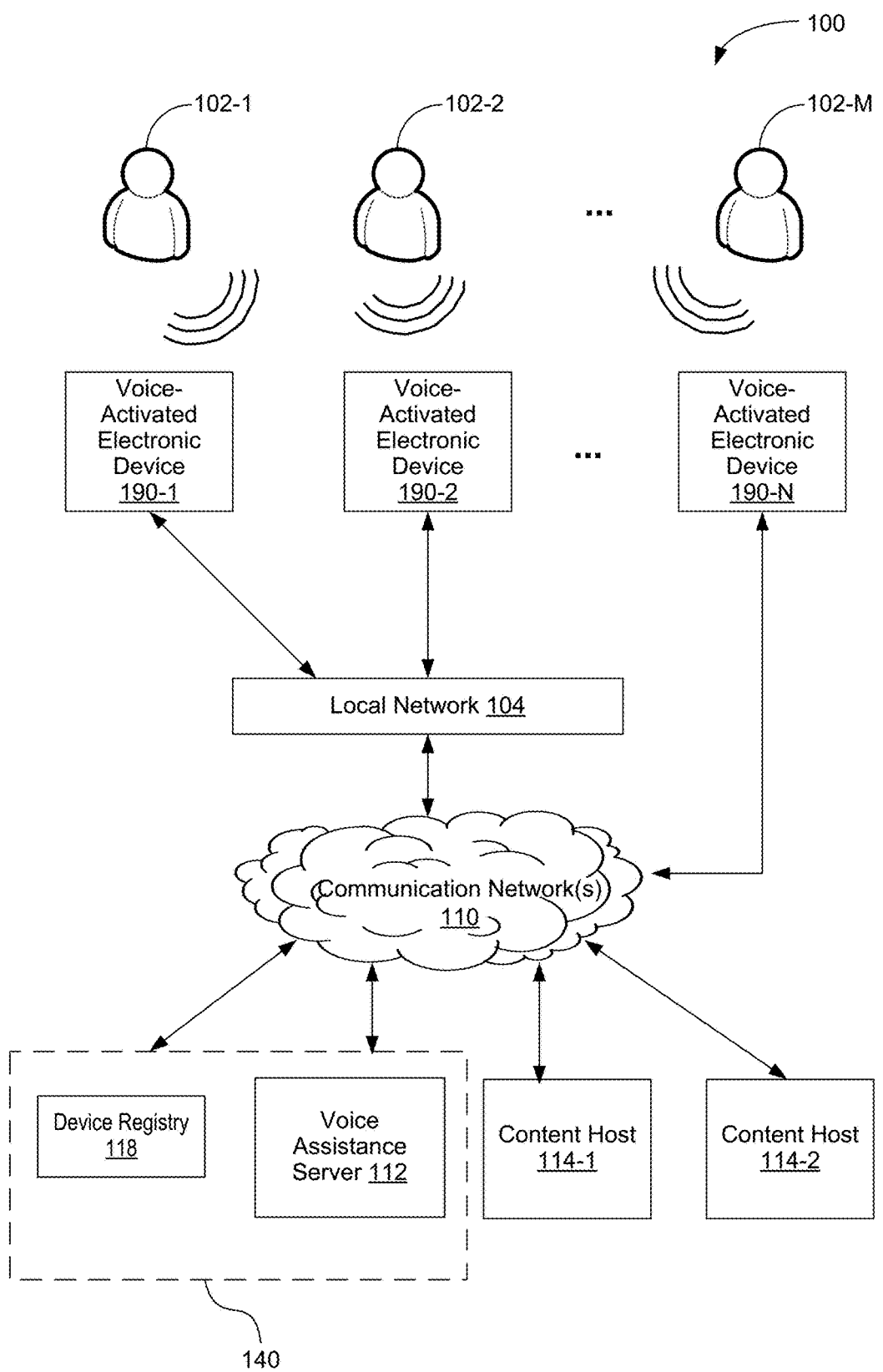
FIG. 1 is an example operating environment in accordance with some implementations.

While the digital revolution has provided many benefits ranging from openly sharing information to a sense of global community, emerging new technology often induces confusion, skepticism and fear among consumers, preventing consumers from benefiting from the technology. Electronic devices are conveniently used as voice interfaces to receive voice inputs from users and initiate voice-activated functions, and thereby offer eyes-free and hands-free solutions to approach both existing and emerging technology. Specifically, the voice inputs received at the electronic device can carry instructions and information even if a user's line of sight is obscured and his hands are full. To enable a hands-free and eyes-free experience, the voice-activated electronic device listens to the ambient (i.e., constantly processes audio signals collected from the ambient) constantly or only when triggered. On the other hand, user identities are linked with a user's voice and a language used by the user. To protect the user identities, these voice-activated electronic devices are normally used in non-public places that are protected, controlled and intimate spaces (e.g., home and car).

In accordance with some implementations, a voice-activated electronic device identifies a speaker of a voice input as one of one or more associated or registered users. Responses to the speaker output by the electronic device are personalized to the identified speaker. The speaker is identified by comparing the speaker's voice input to a set of trained voice models or voice fingerprints. In some implementations, words and phrases used by a speaker to train the voice models are not necessarily predefined and do not need to match words later spoken by the speaker in order for the electronic device to identify the speaker.

Further, in accordance with some implementations, multiple voice-activated electronic devices negotiate a leader amongst themselves to respond to voice inputs from a user. The negotiation may be based on which device detected the voice input the best, or which device is the closest to the user. Additionally, if the voice input is particularly relevant to one of the devices, that device may be selected to respond even if it would otherwise not be selected for response; the relevance of the command included in the voice input to a particular device (e.g., "stop music" should refer to a device playing music) and the state of the device receiving the voice input (e.g., "screen on" vs. "screen off") are considered in determining which device will be the leader.

Further, in accordance with some implementations, a voice-activated device determines whether the surrounding noise is sufficiently interfering with detection of spoken hotwords for waking up the device (in some implementations, a "hotword" is a user defined or predefined word or phrase used to "wake-up" or trigger a voice-activated device to attend/respond to a spoken command that is issued subsequent to the hotword) or other spoken voice inputs. If the noise is sufficiently interfering, the device indicates such and gives the user a hint to use an alternative way of waking up the device or other noise mitigation measures.

Voice Assistant Operating Environment

FIG. 1 is an example operating environment in accordance with some implementations. Operating environment 100 includes one or more voice-activated electronic devices 190 (e.g., electronic devices 190-1 thru 190-N). The one or more voice-activated electronic devices 190 may be located in one or more locations (e.g., all in a room or space of a structure, spread out throughout multiple spaces within a structure or throughout multiple structures (e.g., one in a house and one in the user's car)). The environment 100 optionally includes one or more devices (e.g., media devices, smart home devices) (not shown) with which the voice-activated electronic devices 190 can communicate.

The electronic devices 190 are communicatively coupled, through communication networks 110, to a voice assistance server 112 of a voice assistant service. One or more of the electronic devices 190 are communicatively coupled to a local network 104, which is communicatively coupled to the communication networks 110 (e.g., electronic devices 190-1 and 190-2). In some implementations, the local network 104 is a local area network implemented at a network interface (e.g., a router). The electronic devices 190 that are communicatively coupled to the local network 104 may also communicate with each other through the local network 104.

Optionally, one or more of the electronic devices 190 are communicatively coupled to the communication networks 110 and are not on the local network 104 (e.g., electronic device 190-N). For example, these electronic devices 190 are not on the Wi-Fi network corresponding to the local network 104 but are connected to the communication networks 110 through a cellular connection. In some implementations, communication between electronic devices 190 that are on the local network 104 and electronic devices 190 that are not on the local network 104 are done through the voice assistance server 112. The electronic devices 190 are registered in a device registry 118 of the voice assistant service and thus known to the voice assistance server 112.

The environment 100 also includes one or more content hosts 114. A content host 114 may be a remote content source from which content is streamed or otherwise obtained in accordance with a user voice request. A content host 114 may be an information source from which the voice assistance server 112 retrieves information in accordance with a user voice request.

In some implementations, an electronic device 190 may be associated with multiple users having respective user accounts in the user domain. Any of these users, as well as users not associated with the device, may make voice inputs to the electronic device 190. The electronic device 190 receives these voice inputs from these users 102-1 thru 102-M (including associated and non-associated users), and the electronic device 190 and/or the voice assistance server 112 proceeds to identify, for a voice input, the user making the voice input. With the user identification, a response to that voice input may be personalized to the identified user.

In some implementations, the environment 100 includes multiple electronic devices 190 (e.g., devices 190-1 thru 190-N). The devices 190 are located throughout the environment 100 (e.g., all within a room or space in a structure, spread throughout the structure, some within the structure and some without). When a user 102 makes a voice input, each of the devices 190 either receives the input or does not receive the input (e.g., if the device was too far away from the user). The devices that receive the input receive the input at varying degrees of quality; the quality of the sample of the voice input at a device is based on multiple factors, including but not limited to distance of the user from the device and the noise around the device. The multiple devices 190 negotiate a leader amongst themselves to respond to the user and to receive further voice input from the user 102 based on the quality of the samples of the voice inputs.

In some implementations, an electronic device 190 determines a level of noise around the device and determines whether the determined noise level is sufficiently high to interfere with recognition of the hotword in voice inputs, and thus interfere with awakening of the device by voice, or with recognition of voice requests. If the noise level is determined to be sufficiently high to be interfering, the electronic device 190 indicates to the user that the noise level is interfering and gives the user a hint that the user should use another way to wake up the electronic device 190 (e.g., activate a button). The indication of the interfering noise level and the hint to use another way to wake up the device may be done in the same presentation (e.g., illuminating the wake-up button).

In some implementations, one or more media devices are disposed in the operating environment 100 to provide to one or more occupants media content, news and/or other information. In some implementations, the content provided by the media devices is stored at a local content source, streamed from a remote content source (e.g., content host(s) 114), or generated locally (e.g., through a local text to voice processor that reads a customized news briefing, emails, texts, a local weather report, etc. to one or more occupants of the operating environment 100). In some implementations, the media devices include media output devices that directly output the media content to an audience (e.g., one or more users), and cast devices that are networked to stream media content to the media output devices. Examples of the media output devices include, but are not limited to television (TV) display devices and music players. Examples of the cast devices include, but are not limited to, set-top boxes (STBs), DVD players, TV boxes, and media streaming devices, such as Google's Chromecast™ media streaming device.

In some implementations, the media devices include one or more voice-activated electronic devices 190 that receive, process and respond to voice commands of occupants. In some implementations, the voice-activated electronic devices 190 respond to voice commands by: generating and providing a spoken response to a voice command (e.g., speaking the current time in response to the question, "what time is it?"); streaming media content requested by a user (e.g., "play a Beach Boys song"); reading a news story or a daily news briefing prepared for the user; playing a media item stored on the personal assistant device or on the local network; changing a state or operating one or more other connected devices within the operating environment 100 (e.g., turning lights, appliances or media devices on/off, locking/unlocking a lock, opening windows, etc.); or issuing a corresponding request to a server via a network 110.

In some implementations, the one or more electronic devices 190 are disposed in the operating environment 100 to collect audio inputs for initiating various functions, including media play functions of the media devices. In some implementations, these voice-activated electronic devices 190 (e.g., devices 190-1 thru 190-N) are disposed in proximity to a media device, for example, in the same room with the cast devices and the media output devices. Alternatively, in some implementations, a voice-activated electronic device 190 is disposed in a room having one or more smart home devices but not any media device. Alternatively, in some implementations, a voice-activated electronic device 190 is disposed in a location having no networked electronic device. Further, in some implementations, a room or space in the structure may have multiple electronic devices 190.

In some implementations, the electronic device 190 includes at least one or more microphones, a speaker, a processor and memory storing at least one program for execution by the processor. The speaker is configured to allow the electronic device 190 to deliver voice messages and other audio (e.g., audible tones) to a location where the electronic device 190 is located in the operating environment 100, thereby broadcasting music, reporting a state of audio input processing, having a conversation with or giving instructions to a user of the electronic device 190. As an alternative to the voice messages, visual signals could also be used to provide feedback to the user of the electronic device 190 concerning the state of audio input processing. When the electronic device 190 is a mobile device (e.g., a mobile phone or a tablet computer), its display screen is configured to display a notification concerning the state of audio input processing.

In some implementations, the electronic device 190 is a voice interface device that is network-connected to provide voice recognition functions with the aid of a voice assistance server 112 and/or optionally a cloud cast service server (not shown). For example, the electronic device 190 includes a smart speaker that provides music to a user and allows eyes-free and hands-free access to a voice assistant service (e.g., Google Assistant). Optionally, the electronic device 190 is one of a desktop or laptop computer, a tablet, a mobile phone that includes a microphone, a cast device that includes a microphone and optionally a speaker, an audio system (e.g., a stereo system, a speaker system, a portable speaker) that includes a microphone and a speaker, a television that includes a microphone and a speaker, and a user interface system in an automobile that includes a microphone and a speaker and optionally a display. Optionally, the electronic device 190 is a simple and low cost voice interface device. Generally, the electronic device 190 may be any device that is capable of network connection and that includes a microphone, a speaker, and programs, modules, and data for interacting with voice assistant service. Given simplicity and low cost of the electronic device 190, the electronic device 190 includes an array of light emitting diodes (LEDs) rather than a full display screen, and displays a visual pattern on the LEDs to indicate the state of audio input processing. In some implementations, the LEDs are full color LEDs, and the colors of the LEDs may be employed as a part of the visual pattern to be displayed on the LEDs. Multiple examples of using LEDs to display visual patterns in order to convey information or device status are described in U.S. Provisional Patent Application No. 62/336,566, entitled "LED Design Language for Visual Affordance of Voice User Interfaces," filed May 13, 2016, which is incorporated by reference in its entirety. In some implementations, visual patterns indicating the state of voice processing operations are displayed using characteristic images shown on conventional displays associated with electronic devices that are performing the voice processing operations.

Figure 4A:
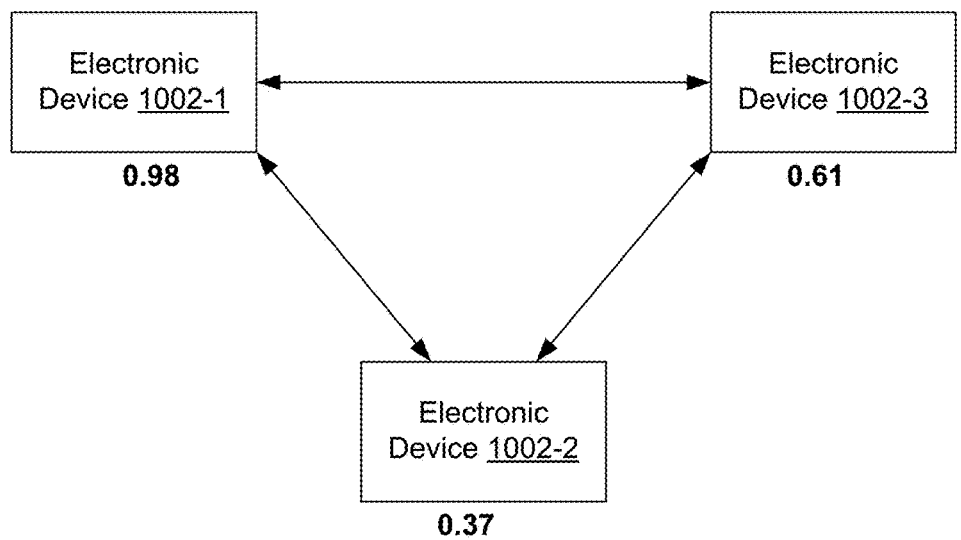
FIGS. 4A-4B are diagrams illustrating an example device leadership negotiation, in accordance with some implementations.

In some implementations, LEDs or other visual displays are used to convey a collective voice processing state of multiple participating electronic devices. For example, in an operating environment where there are multiple voice processing or voice interface devices (e.g., multiple electronic devices 400 as shown in FIG. 4A of the '566 application, duplicated as FIG. 8A below; multiple electronic devices 190), groups of color LEDs (e.g., LEDs 404 as shown in FIG. 4A of the '566 application) associated with respective electronic devices can be used to convey which of the electronic devices is listening to a user, and which of the listening devices is the leader (where the "leader" device generally takes the lead in responding to a spoken request issued by the user).

More generally, the '566 application describes (e.g., see paras. [0087]-[0100]) a "LED Design Language" for indicating visually using a collection of LEDs a variety of voice processing states of an electronic device, such as a "Hot word detection state and listening state," a "Thinking mode or working mode," and a "Responding mode or speaking mode." In some implementations, unique states of voice processing operations described herein are represented using a group of LEDs in accordance with one or more aspects of the "LED Design Language" of the '566 application. These visual indicators can also be combined with one or more audible indicators generated by electronic devices that are performing voice processing operations. The resulting audio and/or visual indicators will enable users in a voice-interactive environment to understand the state of various voice processing electronic devices in the environment and to effectively interact with those devices in a natural, intuitive manner.

When voice inputs from the electronic device 190 are used to control the media output devices via the cast devices, the electronic device 190 effectively enables a new level of control of cast-enabled media devices. In a specific example, the electronic device 190 includes a casual enjoyment speaker with far-field voice access and functions as a voice interface device for the voice assistant service. The electronic device 190 could be disposed in any area in the operating environment 100. When multiple electronic devices 190 are distributed in multiple rooms, they become cast audio receivers that are synchronized to provide voice inputs from all these rooms.

Specifically, in some implementations, the electronic device 190 includes a Wi-Fi speaker with a microphone that is connected to a voice-activated voice assistant service (e.g., Google Assistant). A user can issue a media play request via the microphone of electronic device 190, and ask the voice assistant service to play media content on the electronic device 190 itself or on another connected media output device. For example, the user can issue a media play request by saying to the Wi-Fi speaker "OK Google, play cat videos on my Living room TV." The voice assistant service then fulfils the media play request by playing the requested media content on the requested device using a default or designated media application.

In some implementations, a user can issue a voice request, via the microphone of the electronic device 190, concerning media content that has already been played or is being played on a display device (e.g., the user can ask for information about the media content, buy the media content through an online store, or compose and issue a social post about the media content).

In some implementations, a user may want to take a current media session with them as they move through the house and can request such a service from one or more of the electronic devices 190. This requires the voice assistant service to transfer the current media session from a first cast device to a second cast device that is not directly connected to the first cast device or has no knowledge of the existence of the first cast device. Subsequent to the media content transfer, a second output device coupled to the second cast device continues to play the media content previously a first output device coupled to the first cast device from the exact point within a music track or a video clip where play of the media content was forgone on the first output device. In some implementations, the electronic device 190 that receives the request to transfer the media session can satisfy the request. In some implementations, the electronic device 190 that receives the request to transfer the media session relays the request to another device or system (e.g., a hub device, voice assistance server 112) for handling.

Further, in some implementations, a user may issue, via the microphone of electronic device 190, a request for information or for performance of an action or operation. The information requested may be personal (e.g., the user's emails, the user's calendar events, the user's flight information, etc.), non-personal (e.g., sports scores, news stories, etc.) or somewhere in between (e.g., scores for teams or sports preferred by the user, news stories from the user's preferred sources, etc.). The requested information or action/operation may involve access to personal information (e.g., purchasing a digital media item with payment information provided by the user, purchasing a physical good). The electronic device 190 responds to the request with voice message responses to the user, where the response may include, for example, requests for additional information to fulfill the request, confirmation that the request has been fulfilled, notice that the request cannot be fulfilled, and so forth.

In some implementations, in addition to the voice-activated electronic devices 190 and the media devices (e.g., the output devices and the cast devices), the operating environment 100 may also include one or more smart home devices (not shown). The integrated smart home devices include intelligent, multi-sensing, network-connected devices that integrate seamlessly with each other in a smart home network and/or with a central server or a cloud-computing system to provide a variety of useful smart home functions. In some implementations, a smart home device is disposed at the same location of the operating environment 100 as a cast device and/or an output device, and therefore, is located in proximity to or with a known distance with respect to the cast device and the output device.

The smart home devices in the operating environment 100 may include, but are not limited to, one or more intelligent, multi-sensing, network-connected thermostats, one or more intelligent, network-connected, multi-sensing hazard detectors, one or more intelligent, multi-sensing, network-connected entryway interface devices and (hereinafter referred to as "smart doorbells" and "smart door locks"), one or more intelligent, multi-sensing, network-connected alarm systems, one or more intelligent, multi-sensing, network-connected camera systems, and one or more intelligent, multi-sensing, network-connected wall switches, and one or more intelligent, multi-sensing, network-connected power sockets. In some implementations, the smart home devices in the operating environment 100 of FIG. 1 includes a plurality of intelligent, multi-sensing, network-connected appliances (hereinafter referred to as "smart appliances"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, any one of these smart home device types can be outfitted with microphones and one or more voice processing capabilities as described herein so as to in whole or in part respond to voice requests from an occupant or user.

In some implementations, each of the cast devices and the voice-activated electronic devices 190 is capable of data communications and information sharing with other cast devices, voice-activated electronic devices 190, smart home devices, a central server or cloud-computing system, and/or other devices (e.g., the client device) that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Through the communication networks (e.g., the Internet) 110, the cast devices, the electronic devices 190 and the smart home devices may communicate with a server system (also called a central server system and/or a cloud-computing system herein). Optionally, the server system may be associated with a manufacturer, support entity, or service provider associated with the cast devices and the media content displayed to the user. Accordingly, the server system includes the voice assistance server 112 that processes audio inputs collected by voice-activated electronic devices 190, one or more content hosts 114 that provide the displayed media content, a cloud cast service server creating a virtual user domain based on distributed device terminals, and the device registry 118 that keeps a record of the distributed device terminals in the virtual user environment. Examples of the distributed device terminals include, but are not limited to the cast devices, the media output devices, the electronic devices 190 and the smart home devices. In some implementations, these distributed device terminals are linked to a user account (e.g., a Google user account) in the virtual user domain. It should be appreciated that processing of audio inputs collected by electronic devices 190 can be performed locally at an electronic device 190, at a voice assistance server 112, at another smart home device (e.g., a hub device) or at some combination of all or subset of the above.

It will be appreciated that in some implementations the electronic device(s) 190 also function in an environment without smart home devices. For example, an electronic device 190 can, even in the absence of smart home devices, respond to user requests for information or performance of an action, and/or to initiate or control various media play functions. An electronic device 190 can also function in a wide range of environments, including, without limitation, a vehicle, a ship, a business, or a manufacturing environment.

In some implementations, an electronic device 190 is "awakened" (e.g., to activate an interface for the voice assistant service on the electronic device 190, to put the electronic device 190 into a state where the electronic device 190 is ready to receive voice requests to the voice assistant service) by a voice input that includes a hotword (also called a "wake word"). In some implementations, the electronic device 190 requires awakening if the electronic device 190 has been idle with respect to receipt of voice inputs for at least a predefined amount of time (e.g., 5 minutes); the predefined amount of time corresponds to an amount of idle time allowed before a voice interface session or conversation times out. The hotword may be a word or phrase, and may be a predefined default and/or may be customized by a user (e.g., a user may set a nickname for a particular electronic device 190 as the device's hotword). In some implementations, there may be multiple hotwords that can awaken an electronic device 190. A user may speak the hotword, wait for an acknowledgement response from the electronic device 190 (e.g., the electronic device 190 outputs a greeting), and them make a first voice request. Alternatively, the user may combine the hotword and the first voice request in one voice input (e.g., the voice input includes the hotword followed by the voice request).

In some implementations, the voice inputs spoken by the user to an electronic device 190 may generally be freeform or natural language speech. That is, the voice input need not be strictly limited to a predefined set of words and phrases within a predefined syntax, with possibly certain exceptions (e.g., user needs to speak the hotword first to awaken the device).

In some implementations, an electronic device 190 includes one or more additional ways or affordances to wake up the device besides speaking the hotword to the electronic device 190. The additional ways or affordances may include, for example, activating a predefined button or touch sensor (e.g., a touch sense array) on the electronic device 190.

In some implementations, a voice-activated electronic device 190 interacts with a cast device, a client device or a server system of an operating environment 100 in accordance with some implementations. The voice-activated electronic device 190 is configured to receive audio inputs from an environment in proximity to the voice-activated electronic device 190. Optionally, the electronic device 190 stores the audio inputs and at least partially processes the audio inputs locally. Optionally, the electronic device 190 transmits the received audio inputs or the partially processed audio inputs to a voice assistance server 112 via the communication networks 110 for further processing. The cast device is configured to obtain media content or Internet content from one or more content hosts 114 for display on an output device coupled to the cast device. In some implementations, the cast device and the voice-activated electronic device 190 are linked to each other in a user domain, and more specifically, associated with each other via a user account in the user domain. Information of the cast device and information of the electronic device 190 are stored in the device registry 118 in association with the user account. In some implementations, there is a device registry for cast devices and a registry for voice-activated electronic devices 190. In some implementations, a cloud cast service server manages the cast devices registry and the voice assistance server 112 manages the voice-activated electronic devices registry. The cast devices registry may reference devices in the voice-activated electronic devices registry that are associated in the user domain, and vice versa.

In some implementations, one or more of the electronic devices 190 (and one or more cast devices) are commissioned to the voice assistant service via a client device (not shown). In some implementations, the voice-activated electronic device 190 does not include any display screen, and relies on the client device to provide a user interface during a commissioning process, and similarly for a cast device as well. Specifically, the client device is installed with an application that enables a user interface to facilitate commissioning of a new voice-activated electronic device 190 disposed in proximity to the client device. A user may send a request on the user interface of the client device to initiate a commissioning process for the new electronic device 190 that needs to be commissioned. After receiving the commissioning request, the client device establishes a short range communication link with the new electronic device 190 that needs to be commissioned. Optionally, the short range communication link is established based near field communication (NFC), Bluetooth, Bluetooth Low Energy (BLE) and the like. The client device then conveys wireless configuration data associated with a wireless local area network (WLAN) (e.g., local network 104) to the new or electronic device 190. The wireless configuration data includes at least a WLAN security code (i.e., service set identifier (SSID) password), and optionally includes a SSID, an Internet protocol (IP) address, proxy configuration and gateway configuration. After receiving the wireless configuration data via the short range communication link, the new electronic device 190 decodes and recovers the wireless configuration data, and joins the WLAN based on the wireless configuration data.

In some implementations, additional user domain information is entered on the user interface displayed on the client device, and used to link the new electronic device 190 to an account in a user domain. Optionally, the additional user domain information is conveyed to the new electronic device 190 in conjunction with the wireless communication data via the short range communication link. Optionally, the additional user domain information is conveyed to the new electronic device 190 via the WLAN after the new device has joined the WLAN.

Once the electronic device 190 has been commissioned into the user domain, other devices and their associated activities may be controlled via multiple control paths. In accordance with one control path, an application installed on the client device is used to control the other device and its associated activities (e.g., media play activities). Alternatively, in accordance with another control path, the electronic device 190 is used to enable eyes-free and hands-free control of the other device and its associated activities.

Voice Activated Media Play on a Media Output Device

In some implementations, after the cast device and the voice-activated electronic device 190 are both commissioned and linked to a common user domain, the voice-activated electronic device 190 can be used as a voice user interface to enable eyes-free and hands-free control of media content streaming to the cast device involving no remote control, client device or other second screen device. For example, the user may give voice commands such as "Play Lady Gaga on Living Room speakers." A Lady Gaga music track or video clip is streamed to a cast device associated with the "Living Room speakers." The client device is not involved, nor is any cast device application or media play application loaded on the client device.

In some implementations, a proxy service (e.g., voice assistant service, a cloud cast service) communicatively links the voice-activated electronic device 190 to the cast device and makes casting to the cast device possible without involving any applications on the client device. Specifically, a voice message is captured and recorded by an electronic device 190, and the voice message is configured to request media play on a media output device. Optionally, the electronic device 190 partially processes the voice message locally. Optionally, the electronic device 190 transmits the voice message or the partially processed voice message to a voice assistance server 112 via the communication networks 110 for further processing. The voice assistance server 112 or a cloud cast service server determines that the voice message includes a first media play request, and that the first media play request includes a user voice command to play media content on a media output device and a user voice designation of the media output device. The user voice command further includes at least information of a first media play application (e.g., YouTube and Netflix) and the media content (e.g., Lady Gaga music) that needs to be played.

In accordance with the voice designation of the media output device, the voice assistance server 112 or the cloud cast service server identifies in a device registry 118 a cast device associated in the user domain with the electronic device 190 and coupled to the media output device. The cast device is configured to execute one or more media play applications for controlling the media output device to play media content received from one or more media content hosts 114. Then, the cloud cast service server sends to the cast device a second media play request including the information of the first media play application and the media content that needs to be played. Upon receiving the information sent by the cloud cast service server, the cast device executes the first media play application and controls the media output device to play the requested media content.

In some implementations, the user voice designation of the media output device includes a description of the destination media output device. The voice assistance server 112 or the cloud cast service server identifies in the device registry 118 the destination media output device among a plurality of media output devices according to the description of the destination media output device. In some implementations, the description of the destination media output device includes at least a brand ("Samsung TV") or a location of the media output device ("my Living Room TV").

Voice Activated Media Transfer Among Media Output Devices

In some implementations, the operating environment 100 includes a first cast device (not shown) and a first output device (not shown) coupled to the first cast device. The operating environment 100 also includes a second cast device (not shown) and a second output device (not shown) coupled to the second cast device. The cast devices are optionally located in the same location (e.g., the living room) or two distinct locations (e.g., two rooms) in the operating environment 100. Each of the cast devices is configured to obtain media content or Internet content from content hosts 114 for display on the output device coupled to the respective cast device. Both the first and second cast devices are communicatively coupled to the voice assistance server 112, optionally a cloud cast service server, and the content hosts 114.

The operating environment 100 further includes one or more voice-activated electronic devices 190 that are communicatively coupled to the voice assistance server 112 and optionally the cloud cast service server. In some implementations, the voice-activated electronic devices 190 are disposed independently of the cast devices and the output devices. For example, an electronic device 190 is disposed in a room where no cast device or output device is located. In some implementations, a first electronic device 190 is disposed in proximity to the first cast device and the first output device, e.g., the first electronic device 190, the first cast device and the first output device are located in the same room. Optionally, a second electronic device 190 is disposed independently of or in proximity to the second cast device and the second output device.

When media content is being played on the first output device, a user may send a voice command to any of the electronic devices 190 to request play of the media content to be transferred to the second output device. The voice command includes a media play transfer request. In one situation, the user can issue the voice command to the electronic device 190 disposed in proximity to the first cast device before the user moves to a destination location. Alternatively, in another situation, the user can issue the voice command to the electronic device 190 disposed in proximity to the second device after the user reaches the destination location.

The voice command is transmitted to the voice assistance server 112. The voice assistance server 112 sends a media display information request to the first cast device to request instant media play information of the media content that is currently being played on the first output device coupled to the first cast device. The first cast device then returns to the voice assistance server 112 the requested instant play information including at least information of a first media play application (e.g., YouTube), the media content that is currently being played (e.g., "Lady Gaga—National Anthem—Super Bowl 2016"), and a temporal position related to playing of the media content. The second cast device then receives a media display request including the instant play information from the voice assistance server 112, and in accordance with the instant play information, executes the first media play application that controls the second output device to play the media content from the temporal location.

For example, when a music playlist is played on the first output device, the user says "Play on my living room speakers." The first output device stops playing the currently played song, and the stopped song resumes on the living room speakers. When the song is completed, the living room speakers continue to play the next song on the music playlist previously played on the first output device. As such, when the user is moving around in the operating environment 100, the play of the media content would seamlessly follow the user while only involving limited user intervention (i.e., giving the voice command).

Individual Devices Involved in the Operating Environment

Figure 2A:
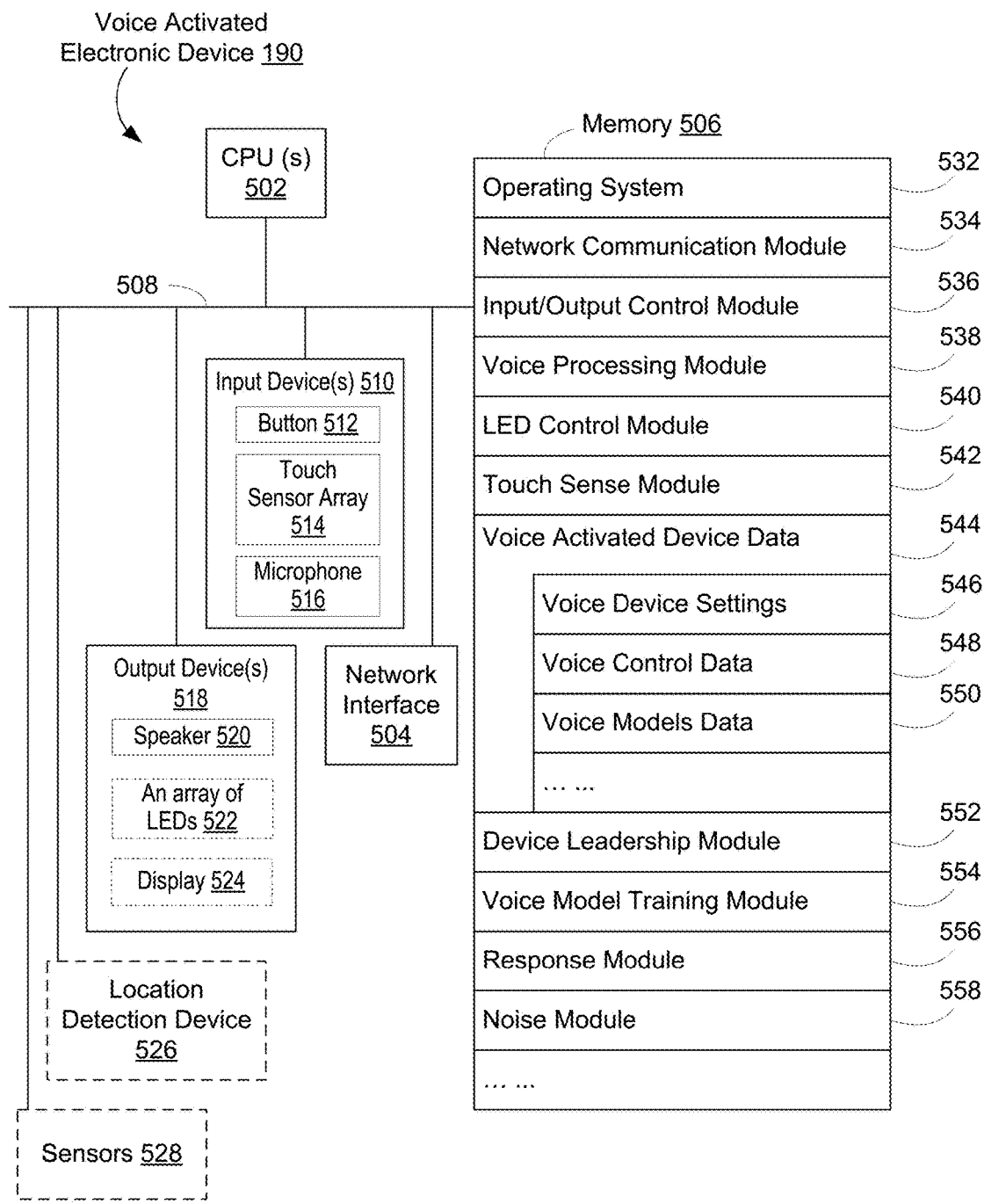
FIGS. 2A-2B are block diagrams illustrating an example electronic device that is applied as a voice interface to collect user voice commands in an operating environment in accordance with some implementations.
Figure 2B:
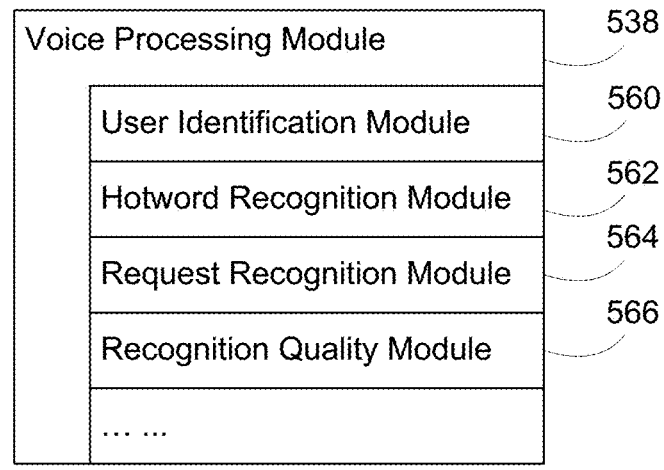
Figure 2B:
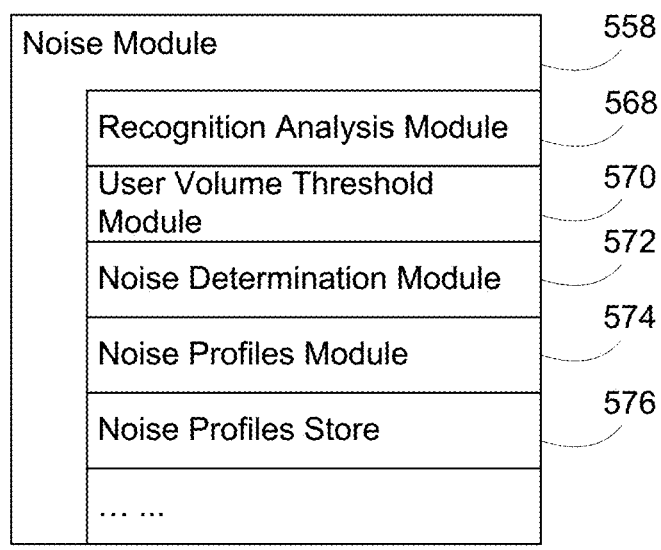

FIGS. 2A-2B are block diagrams illustrating an example electronic device 190 that is applied as a voice interface to collect user voice commands in an operating environment (e.g., operating environment 100) in accordance with some implementations. The electronic device 190, typically, includes one or more processing units (CPUs) 502, one or more network interfaces 504, memory 506, and one or more communication buses 508 for interconnecting these components (sometimes called a chipset). The electronic device 190 includes one or more input devices 510 that facilitate user input, such as a button 512, a touch sense array 514, and one or more microphones 516. The electronic device 190 also includes one or more output devices 518, including one or more speakers 520, optionally an array of LEDs 522, and optionally a display 524. In some implementations, the array of LEDs 522 is an array of full color LEDs. In some implementations, an electronic device 190, depending on the type of device, has either the array of LEDs 522, or the display 524, or both. In some implementations, the electronic device 190 also includes a location detection device 526 (e.g., a GPS module) and one or more sensors 528 (e.g., accelerometer, gyroscope, light sensor, etc.).

Memory 506 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 506, optionally, includes one or more storage devices remotely located from one or more processing units 502. Memory 506, or alternatively the non-volatile memory within memory 506, includes a non-transitory computer readable storage medium. In some implementations, memory 506, or the non-transitory computer readable storage medium of memory 506, stores the following programs, modules, and data structures, or a subset or superset thereof:

Operating system 532 including procedures for handling various basic system services and for performing hardware dependent tasks;

Network communication module 534 for connecting the electronic device 190 to other devices (e.g., the server system 140, one or more cast devices, one or more client devices, one or more smart home devices, and other electronic device(s) 190) via one or more network interfaces 504 (wired or wireless) and one or more networks 110, such as the Internet, other wide area networks, local area networks (e.g., local network 104), metropolitan area networks, and so on;

Input/output control module 536 for receiving inputs via one or more input devices and enabling presentation of information at the electronic device 190 via one or more output devices 518, including:

Voice processing module 538 for processing audio inputs or voice messages collected in an environment surrounding the electronic device 190, or preparing the collected audio inputs or voice messages for processing at a voice assistance server 112;

LED control module 540 for generating visual patterns on the LEDs 522 according to device states of the electronic device 190; and Touch sense module 542 for sensing touch events on a top surface (e.g., on touch sensor array 514) of the electronic device 190;

Voice activated device data 544 for storing at least data associated with the electronic device 190, including:

Voice device settings 546 for storing information associated with the electronic device 190 itself, including common device settings (e.g., service tier, device model, storage capacity, processing capabilities, communication capabilities, etc.), information of one or more user accounts in a user domain, settings regarding restrictions when dealing with a non-registered user, and display specifications associated with one or more visual patterns displayed by the LEDs 522;

Voice control data 548 for storing audio signals, voice messages, response messages and other data related to voice interface functions of the electronic device 190;

Voice models data 550 for storing voice models or voice fingerprints corresponding to users in the user domain that are associated with the electronic device 190;

Device leadership module 552 for determining a leader amongst multiple electronic devices 190 in response to user voice inputs;

Voice model training module 554 for training and generating voice models or voice fingerprints 550 that can be used to identify and disambiguate users in the user domain that are associated with the electronic device 190;

Response module 556 for performing instructions included in voice request responses generated by the voice assistance server 112, and in some implementations, generating responses to certain voice inputs; and Noise module 558 for determining noise levels around the electronic device 190 and provide indications of interfering noise levels and hints to use alternative ways to wake up the electronic device.

In some implementations, the voice processing module 538 includes the following modules:
- User identification module 560 for identifying and disambiguating users who provide voice inputs to the electronic device 190;
- Hotword recognition module 562 for determining whether voice inputs include a hotword for waking up the electronic device 190 and recognizing such in the voice inputs;
- Request recognition module 564 for determining a user request included in a voice input; and
- Recognition quality module 566 for determining a measure of the quality (e.g., a score) of recognition of hotwords and/or requests in voice inputs.

In some implementations, the noise module 558 includes the following modules:
- Recognition analysis module 568 for analyzing how different levels of noise affect the operations of the voice processing module 538 (e.g., in particular the hotword recognition module 562 and/or the request recognition module 564) with respect to the particular electronic device 190;
- User volume threshold module 568 for determining, for a given distance from the electronic device 190, highest comfortable volume levels at which users will utter voice inputs to the electronic device, 190;
- Noise determination module 572 for determining a noise level and a noise profile around the electronic device 190;
- Noise profiles module 574 for training and generating noise profiles of noises that interfere with recognition of hotwords and/or requests in voice inputs; and
- Noise profiles store 576 for storing noise profiles that have been determined to be interfering.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 506, optionally, stores a subset of the modules and data structures identified above. Furthermore, memory 506, optionally, stores additional modules and data structures not described above. In some implementations, a subset of the programs, modules, and/or data stored in the memory 506 can be stored on and/or executed by the server system 140/voice assistance server 112.

In some implementations, one or more of the modules in memory 506 described above are part of a voice processing library of modules. The voice processing library may be implemented and embedded on a wide variety of devices. An example of a voice processing library is described in U.S. Provisional Patent Application No. 62/334,434, entitled "Implementations for Voice Assistant on Devices," filed May 10, 2016, which is incorporated by reference herein in its entirety.

Figure 3:
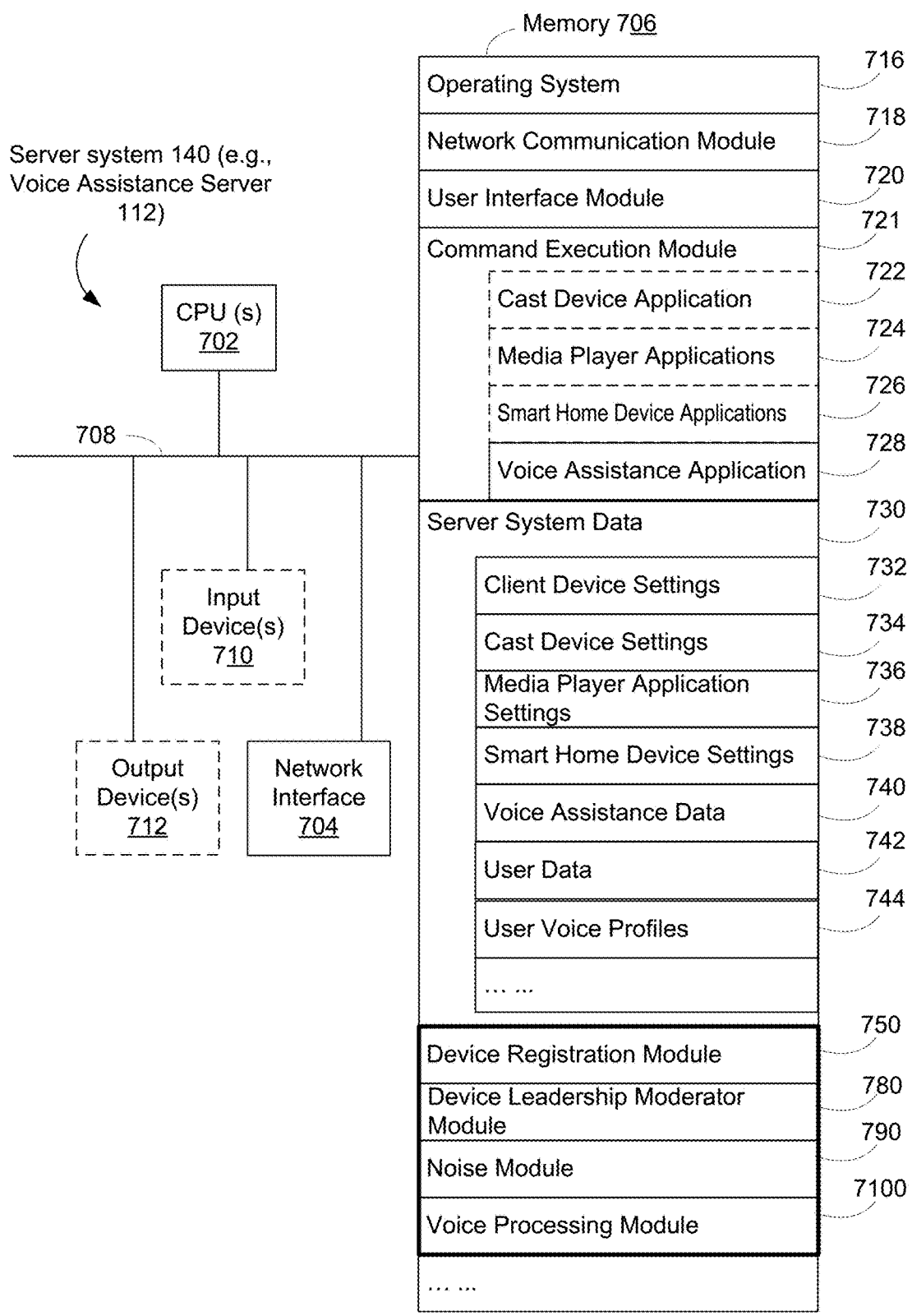
FIG. 3 is a block diagram illustrating an example server in the server system of an operating environment in accordance with some implementations. An example server is one of a voice assistance server.

FIG. 3 is a block diagram illustrating an example server in the server system 140 of an operating environment (e.g., operating environment 100) in accordance with some implementations. An example server is one of a voice assistance server 112. The server 140, typically, includes one or more processing units (CPUs) 702, one or more network interfaces 704, memory 706, and one or more communication buses 708 for interconnecting these components (sometimes called a chipset). The server 140 could include one or more input devices 710 that facilitate user input, such as a keyboard, a mouse, a voice-command input unit or microphone, a touch screen display, a touch-sensitive input pad, a gesture capturing camera, or other input buttons or controls. Furthermore, the server 140 could use a microphone and voice recognition or a camera and gesture recognition to supplement or replace the keyboard. In some implementations, the server 140 includes one or more cameras, scanners, or photo sensor units for capturing images, for example, of graphic series codes printed on the electronic devices. The server 140 could also include one or more output devices 712 that enable presentation of user interfaces and display content, including one or more speakers and/or one or more visual displays.

Memory 706 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 706, optionally, includes one or more storage devices remotely located from one or more processing units 702. Memory 706, or alternatively the non-volatile memory within memory 706, includes a non-transitory computer readable storage medium. In some implementations, memory 706, or the non-transitory computer readable storage medium of memory 706, stores the following programs, modules, and data structures, or a subset or superset thereof:
- Operating system 716 including procedures for handling various basic system services and for performing hardware dependent tasks;
- Network communication module 718 for connecting the server system 140 to other devices (e.g., various servers in the server system 140, client devices, cast devices, electronic devices 190, and smart home devices) via one or more network interfaces 704 (wired or wireless) and one or more networks 110, such as the Internet, other wide area networks, local area networks, metropolitan area networks, and so on;
- User interface module 720 for enabling presentation of information (e.g., a graphical user interface for presenting application(s) 826-830, widgets, websites and web pages thereof, and/or games, audio and/or video content, text, etc.) at a client device;
- Command execution module 721 for execution on the server side (e.g., games, social network applications, smart home applications, and/or other web or non-web based applications for controlling a client device, a cast devices, an electronic device 190 and a smart home devices and reviewing data captured by such devices), including one or more of:
  - a cast device application 722 that is executed to provide server-side functionalities for device provisioning, device control, and user account management associated with cast device(s);
  - one or more media player applications 724 that is executed to provide server-side functionalities for media display and user account management associated with corresponding media sources;
  - one or more smart home device applications 726 that is executed to provide server-side functionalities for device provisioning, device control, data processing and data review of corresponding smart home devices; and a voice assistance application 728 that is executed to arrange voice processing of a voice message received from the electronic device 190 or directly process the voice message to extract a user voice command and one or more parameters for the user voice command (e.g., a designation of a cast device or another electronic device 190); and Server system data 730 storing at least data associated with automatic control of media display (e.g., in an automatic media output mode and a follow-up mode), including one or more of:

Client device settings 732 for storing information associated with one or more client device, including common device settings (e.g., service tier, device model, storage capacity, processing capabilities, communication capabilities, etc.), and information for automatic media display control;

Cast device settings 734 for storing information associated with user accounts of the cast device application 722, including one or more of account access information, information for device settings (e.g., service tier, device model, storage capacity, processing capabilities, communication capabilities, etc.), and information for automatic media display control;

Media player application settings 736 for storing information associated with user accounts of one or more media player applications 724, including one or more of account access information, user preferences of media content types, review history data, and information for automatic media display control;

Smart home device settings 738 for storing information associated with user accounts of the smart home applications 726, including one or more of account access information, information for one or more smart home devices (e.g., service tier, device model, storage capacity, processing capabilities, communication capabilities, etc.);

Voice assistance data 740 for storing information associated with user accounts of the voice assistance application 728, including one or more of account access information, information for one or more electronic device 190 (e.g., service tier, device model, storage capacity, processing capabilities, communication capabilities, etc.);

User data 742 for storing information associated with users in the use domain, including users' subscriptions (e.g., music streaming service subscriptions, video streaming service subscriptions, newsletter subscriptions), user devices (e.g., devices registered in the device registry 118 associated with respective users), user accounts (e.g., users' email accounts, calendar accounts, financial accounts), and other user data; and User voice profiles 744 for storing voice profiles of the users in the user domain, including, for example, voice models or voice fingerprints of the users and comfortable volume level thresholds of the users.

Device registration module 750 for managing the device registry 118 coupled to the voice assistance server 112;

Device leadership moderator module 780 for moderating device leadership determinations between the electronic devices 190 in the operating environment;

Noise module 790 for determining noise levels around the electronic device 190; and Voice processing module 7100 for processing audio inputs or voice messages collected in an environment surrounding the electronic device 190.

In some implementations, the voice assistance server 112 is primarily responsible for processing of voice inputs and for noise mitigation, and thus one or more of the programs, modules, and data structures in memory 506 described above with reference to FIGS. 2A-2B are included in respective modules in memory 706 (e.g., the programs, modules, and data structures included with voice processing module 538 are included in voice processing module 7100, and the programs, modules, and data structures included with noise module 558 are included in noise module 790). The electronic device 190 either transmits captured voice inputs to the voice assistance server 112 for processing, or first pre-processes the voice inputs and transmits the pre-processed voice inputs to the voice assistance server 112 for processing. In some implementations, the voice assistance server 112 and the electronic device 190 has some shared and some divided responsibilities regarding processing of voice inputs and noise mitigation, and the programs, modules, and data structures shown in FIGS. 2A-2B may be included in both or divided amongst the voice assistance server 112 and the electronic device 190. Other programs, modules, and data structures shown in FIGS. 2A-2B (e.g., voice models data 550, voice model training module 554), or analogues thereof, may also be included in the voice assistance server 112.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 706, optionally, stores a subset of the modules and data structures identified above. Furthermore, memory 706, optionally, stores additional modules and data structures not described above.

Example Device Leadership Negotiation

Figure 4B:
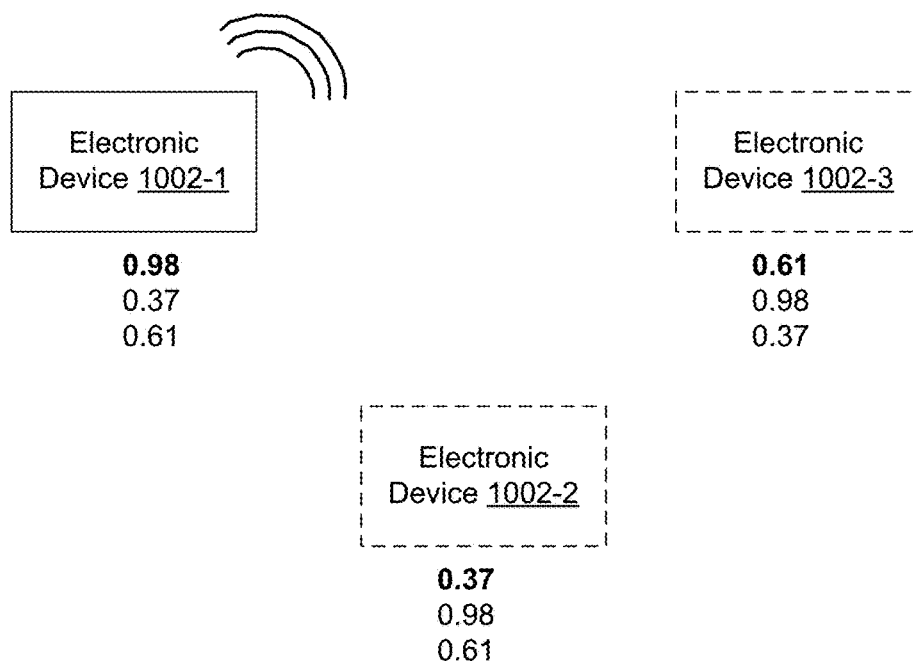

FIGS. 4A-4B illustrate an example of a device leadership negotiation between multiple electronic devices (e.g., electronic devices 190) in accordance with some implementations. In an operating environment with multiple electronic devices 190 (e.g., operating environment 100), when a user in the environment makes a voice input, one or more of the multiple electronic devices 190 detect and receive the voice input. The electronic devices 190 determine a leader amongst themselves to respond to the user's voice input and to detect further voice inputs from the user.

FIG. 4A shows three voice-activated electronic devices 1002-1 thru 1002-3 (e.g., electronic devices 190) in an operating environment (e.g., operating environment 100). They may all be in the same space as a user (not shown), e.g., in the same room. The user makes a voice input (e.g., an utterance) (not shown), and the three electronic devices 1002-1 thru 1002-3 detect and capture a sample of the voice input at varying degrees or levels of quality. The quality of a captured sample of the voice input at an electronic device may be affected by one or more factors, including but not limited to surrounding noise, capabilities of the device, distance and position of the device relative to the user, position of the device within the space, and so on.

In some implementations, each of the electronic devices determines a level of quality of the respective sample of the voice input captured by the electronic device. The quality level may be expressed as a score or some other value. For example, in FIG. 4A, each of the electronic devices 1002 has captured a respective sample of a user's voice input and has determined as score for its respective sample; the sample at electronic device 1002-1 is scored as 0.98 (on a scale of 0 to 1, with 1 corresponding to the highest quality), the sample at electronic device 1002-2 is scored as 0.37, and the sample at electronic device 1002-3 is scored as 0.61. In some implementations, the recognition quality module 566 (FIG. 2B) at the electronic device 1002 determines the quality level of the respective captured sample. In some implementations, criteria for evaluating the quality of a voice sample include, for example, loudness or amplitude of the sample, presence or absence of noise (e.g., cross-talk, hissing) and corresponding level, presence or absence of distortion (e.g., echo) and corresponding level, frequency profile of the sample, and so forth.

The electronic devices 1002 communicate their quality scores with each other. Thus, for example, electronic device 1002-1 receives the quality scores from electronic devices 1002-2 and 1002-3. Electronic device 1002-2 receives the quality scores from electronic devices 1002-1 and 1002-3. Electronic device 1002-3 receives the quality scores from electronic devices 1002-1 and 1002-2. If all of the electronic devices 1002 are on the same local network (e.g., local network 104, FIG. 1), the electronic devices 1002 exchange scores through the local network. For example, an electronic device 1002 may send its quality score to the other electronic devices 1002 by sending multicast messages within the local network. If at least one of the electronic devices 1002 is not on the local network, scores may be sent to server system 140, and the device leadership moderator module 780 of the voice assistance server 112 distributes the scores to the electronic devices 1002. Alternatively, the device leadership moderator module 780 determines which of the devices is to be the leader based on the scores received, and sends the result of the determination to the devices. In some implementations, the electronic devices 1002 discover each other and their locations through the voice assistance server 112 and device registry 118 (e.g., a device 1002 periodically checks in with the voice assistance server 112 and is informed of other devices associated with the same user account based on information in the device registry 118).

In some implementations, if just one of the multiple electronic devices 1002 captured a sample of the voice input (e.g., the other electronic devices 1002 were too far away from the user to detect the voice input), the device that captured the voice input sample is determined to be the leader. In some implementations, if an electronic device 1002 failed to capture a sample of the voice input (e.g., the device was too far away from the user to detect the voice input), the quality score for that device for the voice input is 0.00 or a null score; a device with a "0.00" or null score is eliminated from contention to be the leader.

When an electronic device 1002 receives the scores from the other electronic devices 1002, the electronic device compares its quality score with the scores from the other devices. If its score is not the best (e.g., highest) amongst the scores, the electronic device forgos outputting responses (e.g., responses generated by the server system 140) to the voice input (e.g., by powering down or "turning off" the speaker 520). If its score is the best amongst the scores, the electronic device outputs responses to the voice input and subsequent voice inputs; this device is determined to be the "leader." In some implementations, the leader also proceeds to detect and process or pre-process subsequent voice inputs from the user (whether it be the leader processing the voice inputs and generating the responses, the leader pre-processing the voice inputs for transmission to the voice assistance server 112 which generates the responses, or the leader simply transmitting the voice inputs to the voice assistance server 112 which generates the response), and the non-leaders forgo receiving, detecting, and processing subsequent voice inputs from the user.

In some implementations, the leader determination is performed in response to a user's voice input to awaken the device (e.g., a voice input that includes the hotword). In some implementations, the leader determination may be performed in response to each voice input from the user or at intervals of a predefined number of voice inputs from the user (e.g., at every 5th voice input from the user). In this way, the leadership determination may be updated to account for changing conditions (e.g., the user moving around, the noise level around the devices change, etc.).

In some implementations, the leader determination based on quality scores may be overridden based on additional criteria. That is, a device may be determined to be the leader even if it would otherwise not be determined to be the leader based merely on the quality scores. The additional criteria may include, for example, a type of request or command in the voice input and a state of the device. For example, if the voice input includes a request to play or stop playing a video, then the request is of particular relevance to an electronic device 1002 that is capable of playing videos (e.g., a smart TV, a cast device) and is not particularly relevant to an electronic device 1002 that is an audio-only device (e.g., sound system, portable speaker). When the request is of particular relevance to an electronic device 1002, then that electronic device 1002 may be determined to be the leader even if the quality score for that device is not the highest. In some implementations, if the request is of particular relevance to multiple electronic devices in the space, then the one with the best quality score amongst the devices to which the request has particular relevance is determined to be the leader. As another example, if the command in the voice input is a command to change device state (e.g., "screen off"), then a device in a state to which the command is applicable (e.g., a smart TV whose screen is currently on) may be determined to be the leader despite a lower quality score, and a device in a state to which the command is not applicable (e.g., a smart TV whose screen is already off) is passed over for leadership. Further, if the request/command is not of particular relevance to any of the devices 1002 (e.g., the devices 1002 are audio-only voice interface devices that can communicate with a non-voice-interface cast device through the voice interface server 112, and the command is a request to play video via the cast device), the leadership determination is determined based on quality scores as described above. In some implementations, multiple leadership determination criteria (e.g., quality scores, relevance of command, and state of the device, as described above) may be implemented as a multi-step leadership determination (e.g., determine relevance of the command and the device state to narrow leadership candidates, then determine leader based on quality scores; determine device with highest score, then check if command relevance or device state criteria apply to the other devices) or as a weighted determination (e.g., each criterion is accounted for and weighted in a weighted score).

FIG. 4B illustrates a result of the device leadership negotiation amongst the electronic devices 1002 in FIG. 4A.

Electronic device 1002-1 determines that its quality score is the best amongst the three electronic devices 1002, and it assumes leadership for outputting responses to the user. Electronic devices 1002-2 and 1002-3 determine that their quality scores are not the best amongst the three electronic devices 1002, and power down their speakers 520 and forgo outputting responses to the user.

In some implementations, the electronic devices 1002 that are not the leader also power down their microphones 516, and thus do not detect further voice inputs from the user; the leader device also is the leader with respect to detection and processing of further voice inputs from the user. In some implementations, the electronic devices 1002 that are not the leader maintain power to their microphones 516 and provide assistance re detection of further voice inputs from the user. For example, the leader device and the non-leader devices receive and record respective samples of a voice input and transmit them to the voice assistance server 112, which may user the multiple samples together to better process the voice input (e.g., aggregate the samples, choose the best sample for processing, compare the samples to get the best parts of each).

In some implementations, the electronic devices 1002 repeat the leadership determination process as described above after each voice input from the user. In some implementations, the electronic devices 1002 repeat the leadership determination process as described above after intervals of a predefined number of voice inputs (e.g., determine a leader again at every 5th voice inputs or at every 10th voice input).

In some implementations, one or more of the electronic devices 1002 output a visual response after a leader is determined (e.g., along with the audio response to the voice input, the determined leader displays a notification or a predefined LED light pattern indicating that it is the leader).

In some implementations, each of the electronic devices 1002 outputs a visual indication (e.g., a predefined LED light pattern) that it is listening whenever it is listening to a user (e.g., receiving and detecting the user's voice input), and then just the leader device outputs the response to the voice input per the leadership determination. For example, when a user is speaking a voice input, the electronic devices 1002-1 thru 1002-3 display the visual indication to indicate that they are listening while receiving the voice input, and afterwards just the leader device 1002-1 outputs the response per the leadership determination.

In some implementations, an electronic device 1002 indicates that it is listening by displaying using a group of LEDs a characteristic visual pattern, such as one of the patterns shown in FIG. 4G of the '566 application (duplicated as FIG. 8D below). The visual patterns can be static (unchanging) or dynamic (giving the impression of movement through changes in the color, brightness, duty cycle, etc. of individual LEDs). In some implementations, an electronic device 1002 indicates that it is the leader among multiple listening devices by displaying another characteristic visual pattern using its LEDs. Similarly, multiple listening devices engaged in a negotiation to determine which device should be the leader can indicate that the negotiation is ongoing by displaying another characteristic visual pattern using their respective LEDs.

Example Process for Multi-User Personalization

Figure 5:
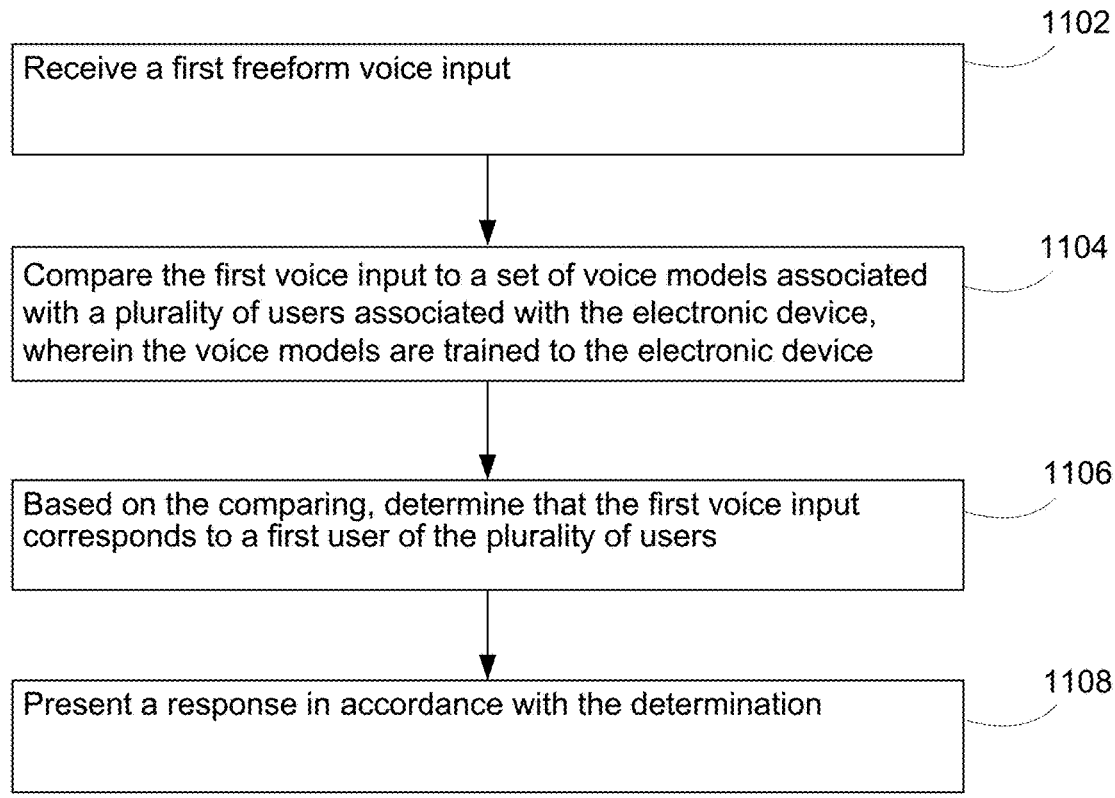
FIG. 5 is a flow diagram illustrating a method of responding to a voice input of a user in accordance with some implementations.

FIG. 5 is a flow diagram illustrating a method 1100 of responding to a voice input of a user in accordance with some implementations. The method 1100 is implemented at an electronic device 190 with one or more microphones, a speaker, one or more processors and memory storing one or more programs for execution by the one or more processors.

The electronic device 190 receives (1102) via the one more microphones 516 a first voice input from a user. The electronic device 190 captures and records a sample of the first voice input via the microphone 516. In some implementations, the first voice input is a freeform voice input, in the sense that the voice input need not be strictly limited to a predefined set of words and phrases within a predefined syntax; the voice input may be a natural language voice input, for example.

The electronic device 190 compares (1104) the first voice input to a set of voice models associated with a plurality of users associated with the electronic device 190, where the voice models are trained to the electronic device. The user identification module 560 compares the recorded sample of the first voice input to voice models in voice models data 550. The voice models data 550 include voice models or voice fingerprints of one or more users in the user domain that are associated with the electronic device 190 (e.g., users registered to the electronic device 190). In some implementations, the voice models are trained by the voice model training module 554 to the electronic device 190.

Based on the comparing, the electronic device 190 determines (1106) that the first voice input corresponds to a first user of the plurality of users. For example, the user identification module 560 identifies a voice model in voice models data 550 that best matches the first voice input, and in accordance with the identification of the match determines that the user speaking the first voice input is the user to which the matching voice model corresponds. In some implementations, the user identification module 560 also determines a confidence level or some other similar measure of the quality or closeness of the match between a voice model and the voice input, and identifies a match only if the match is the best and the confidence level is above a predefined threshold.

The electronic device 190 presents (1108) a response in accordance with the determination. In some implementations, the electronic device 190 generates the response in accordance with the determination and with the first voice input. The response includes an indication of the identity of the identified first user, to let the first user know that he has been identified. The response also includes a response to any voice request in the first voice input. For example, in response to a hotword voice input to awaken the electronic device 190, the electronic device 190 generates and presents (e.g., outputs) a voice greeting that includes the first user's name (e.g., "Hello David," "Good morning Mary"). The response may include a voice output and/or instructions to another device to perform an operation. For instructions to perform an operation, the indication of the identified user's identify is included, so that the operation is performed with respect to the identified user. For example, if the operation is playing music from a music subscription, the device plays music from the identified user's music subscription.

In some implementations, the response is an audible voice output, and presenting the response includes outputting the audible voice output. The electronic device 190 outputs the audible voice output through the speaker 520.

In some implementations, the electronic device determines a user request based on the first voice input, and generates the response in accordance with the determined user request. In some implementations, generating the response in accordance with the determination and with the first voice input includes these determining and generating operations. In addition to identifying the speaker of the voice input, the electronic device 190 determines the user request in the voice input (e.g., a media playback request, a request for news headlines, a request for emails to be read, etc.), and generates a response that is responsive to the request (e.g., an audible acknowledgement of the request, an audible inquiry to the user for more information needed to fulfill the request).

In some implementations, the determined user request includes a request to the electronic device to awaken, and the response includes an audible greeting, where the greeting includes an indication of an identity of the determined first user. If the voice input includes a hotword (i.e., the voice input is a request to the electronic device 190 to awaken), the generated response includes an audible greeting that includes an identity of the first user (e.g., "Good morning Dave"). The greeting indicates that the electronic device 190 has awakened and indicates the identity of the user as identified by the electronic device 190.

In some implementations, the determined user request includes a request for information, and generating the response in accordance with the determined request includes obtaining the requested information with respect to the first user. If the request is a request for information (e.g., a request to read the user's emails, request to say out loud the user's upcoming calendar events), the electronic device 190 accesses the identified user's information (e.g., the user's emails, the user's calendar) to generate the response. In some implementations, obtaining the requested information with respect to the determined first user comprises accessing an account associated with the first user; in order to obtain the identified user's information for the response, the electronic device 190 accesses the user's accounts (e.g., the user's email account, the user's calendar account). At the electronic device 190, the user account information may be stored in the voice device settings 546.

In some implementations, the electronic device 190 receives a second voice input, compares the second voice input to the set of voice models, based on the comparing, determines that the second voice input corresponds to a second user of the plurality of users, and presents a response in accordance with the determination that the second voice input corresponds to the second user. In some implementations, the electronic device generates the response in accordance with the determination and with the second voice input. If a different user associated with the electronic device 190 speaks a voice input to the electronic device 190, the electronic device 190 identifies the different user in a similar manner as the identification of the first user—comparing the different user's voice input to the voice models and finding a best match. With the identification of the different user, the electronic device 190 is able to generate a response based on this new identification. Thus, the electronic device 190 is able to switch between associated users by comparing the voice inputs to the voice models and identifying the speaking user based on the comparing, negating a need for the users to explicitly speak a command to switch the focus of the electronic device 190 from one user to another user.

In some implementations, the electronic device 190 receives a third voice input, compares the third voice input to the set of voice models, based on the comparing, determines that the third voice input corresponds to none of the plurality of users, and in accordance with the determination that the third voice input corresponds to none of the plurality of users, restricts functionality of the electronic device. If a user who is not associated with the electronic device 190 speaks a voice input to the electronic device 190, the electronic device 190 receives the voice input and attempts to identify the user. As this user is not associated with the electronic device 190 and thus does not have an associated voice model in the voice models data 550, the electronic device 190 determines that this user is an unidentified user. For this unidentified user, the electronic device 190 may restrict its functionality in order to prevent personal or private information from being accessed. For example, the electronic device 190 may act on only requests from the unidentified user that involve non-private or non-personal information (e.g., request for sports scores, news, stocks, weather). In some implementations, the electronic device 190 may deny the unidentified user access to any functionality of the electronic device 190 and the voice assistant service (e.g., by ignoring the unidentified user's voice inputs or responding with a response indicating that the user is not authorized). In some implementations, the restriction of functionality to unidentified users is based on settings for the device (e.g., voice device settings 546). The device owner can set, for example, whether to restrict functionality, for unidentified users, entirely or just to functionality that does not involve personal or private information.

In some implementations, the electronic device includes a display, and displays on the display an indication of an identity of the determined first user. If the electronic device 190 includes a display 524, the electronic device 190 may display the identified user's identify (e.g., display the identified user's name, display a greeting with the identified user's name, displaying the identified user's picture, avatar, or other image associated with the identified user) on the display 524 to indicate that the electronic device 190 has identified a speaker of the voice input and to give the user an opportunity to verify the identification.

In some implementations, the electronic device includes a display, and displays on the display a visual user interface associated with the determined first user. If the electronic device 190 includes a display 524, the electronic device 190 may display a visual user interface identified with the identified user (e.g., a user interface with a theme associated with the identified user applied). In some implementations, the electronic device 190 displays on the LEDs 522 a pattern associated with the identified user.

In some implementations, the electronic device 190 receives the voice input (e.g., capture a sample of the voice input), as in step 1102, and sends the voice input to the voice assistance server 112. The voice assistance server 112 compares the voice input to a set of voice models (e.g., voice models in user voice profiles 744) associated with a plurality of users associated with the electronic device 190, and based on the comparing, determines the identity of the user who spoke the voice input, similar to steps 1104 and 1106. The voice assistance server 112 generates the response to the voice input, and transmits the generated response to the electronic device 190, which outputs the response. In some implementations, the voice assistance server 112 identifies the user, and transmits the user identification result to the electronic device 190, which generates and outputs a response in accordance with the identification result received from the voice assistance server 112.

In some implementations, the electronic device 190 receives the voice input (e.g., capture a sample of the voice input), as in step 1102, performs pre-processing on the voice input, and sends the pre-processed voice input to the voice assistance server 112. The pre-processing may include identification of the speaking user, as in steps 1104 and 1106, and the identification result accompanies the voice input to the voice assistance server 112. Alternatively, the user identification is performed by the voice assistance server 112. The voice assistance server 112 receives the pre-processed voice input, identifies the speaking user if not already performed by the electronic device 190 (similar to steps 1104 and 1106), generates the response to the voice input, and transmits the generated response to the electronic device 190, which outputs the response.

In some implementations, the electronic device 190 receives the voice input (e.g., capture a sample of the voice input) and either sends the voice input to the voice assistance server 112 or performs pre-processing and sends the pre-processed voice input to the voice assistance server 112. The voice assistance server 112 compares the voice input to a set of voice models (e.g., voice models in user voice profiles 744) associated with a plurality of users associated with the electronic device 190, and based on the comparing, determines the identity of the user who spoke the voice input, as in steps 1104 and 1105. The voice assistance server 112 generates the response to the voice input and transmits the generated response to the electronic device 190, which outputs the response. In some implementations, the voice assistance server 112 identifies the user, and transmits the user identification result to the electronic device 190, which generates and outputs a response in accordance with the identification result received from the voice assistance server 112.

As described above, the speaking user is identified by matching a voice model or voice fingerprint to the voice input. In some implementations, the electronic device 190 is configured to perform a process for capturing and training voice models or voice fingerprints. For example, when a user is to be associated with the electronic device 190 (e.g., registered to the device), the electronic device 190 (e.g., voice model training module 554) may initiate and guide the user to be associated with the electronic device 190 through a step-by-step process to capture and train a voice model of the user. During the process, the electronic device 190 may prompt the user to speak one or more words or phrases (e.g., the hotword, a phrase or sentence that includes multiple distinct phonemes) in order to generate and train the voice model. The voice model training module 554 may direct the LED control module 540 to illuminate various visual patterns on the LEDs 522 to indicate to the user a status of the voice model capture and training process. In some implementations, the electronic device 190 stores the trained voice models in voice models data 550, and optionally transmits the trained voice models to the voice assistance server 112 for storage (e.g., in user voice profiles 744).

In some implementations, a given user has voice models for each electronic device 190 with which the user is associated. The voice models at the respective devices 190 are trained to the particular device, thus accounting for the particular devices and the environments surrounding the respective devices.

In some implementations, the voice model training process is performed by the voice assistance server 112 in conjunction with the electronic device 190. For example, when a user is to be associated with an electronic device 190, a voice model training module (not shown) at the voice assistance server 112 transmits instructions and audio outputs to the electronic device 190. The electronic device 190 executes the instructions and output the audio outputs to guide the user through the training process similar to the training process performed by the voice model training module 554 described above. The electronic device 190 captures the user's spoken voice inputs to the training process and transmits the captured voice inputs to the voice assistance server 112, which generates the voice models and stores them in user voice profiles 744. In some implementations, the voice assistance server 112 transmits to the electronic device 190 voice models of users associated with the electronic device 190 for storage (e.g., in voice models data 550) and local use.

In some implementations, when a voice model is generated and trained for a user, an authentication token is also generated for the user. The authentication token authenticates the user to the voice assistance server 112. The speaker's voice input is matched to voice models associated with different users. When a matching voice model is found for the speaker's voice input, the authentication token for the user account associated with the matching voice model is used. In some implementations, authentication tokens are pre-generated but initially not associated with any voice model. The training process associates a voice model trained as a result of the training process to a pre-generated authentication token. In some implementations, after the electronic device 190 identifies the speaker of a voice input, the voice input (or the data containing the user request and associated parameters determined from the voice input) is transmitted to the voice assistance server 112 along with the authentication token associated with the speaker; the authentication token authenticates the speaker to the voice assistance server 112. In some implementations, a speaker may be associated with an authentication token of a user who has granted permission to any speaker. For example, a user associated with an electronic device 190 may configure his account to allow anyone to use his music service login credentials, so that other users can access any connected output device (e.g., speakers) near the user's device 190.

In some implementations, an electronic device 190 identifies the speaking user by detecting a nearby key device associated with the speaking user (e.g., using Bluetooth low energy or ultrasonic RF).

In some implementations, a content host 114 generates the audible response to a voice input. For example, the voice input may include a request for the balance in a bank account associated with the user (e.g., "what is the balance in my Chase account?"). For such a voice input, the electronic device 190 or the voice assistance server 112 identifies the speaking user, as described above. After identifying the user and obtaining the bank account information (from, e.g., user data 742), the electronic device 190 or the voice assistance server 112 transmits a query for the account balance (e.g., through an application programming interface (API)) to a content host 114 associated with the bank where the bank account is located (e.g., the bank's database system). The bank content host obtains the balance from its databases and generates an audible response responsive to the request. The bank content host transmits the audible response to the electronic device 190 or to the voice assistance server 112 (which then transmits the audible response to the electronic device 190), and the electronic device 190 outputs the audible response. In this way, transmission and storage of account data in numerical form over networks and on the device is reduced, which promotes security and privacy of user data.

Example Process for Device Leadership Negotiation

Figure 6:
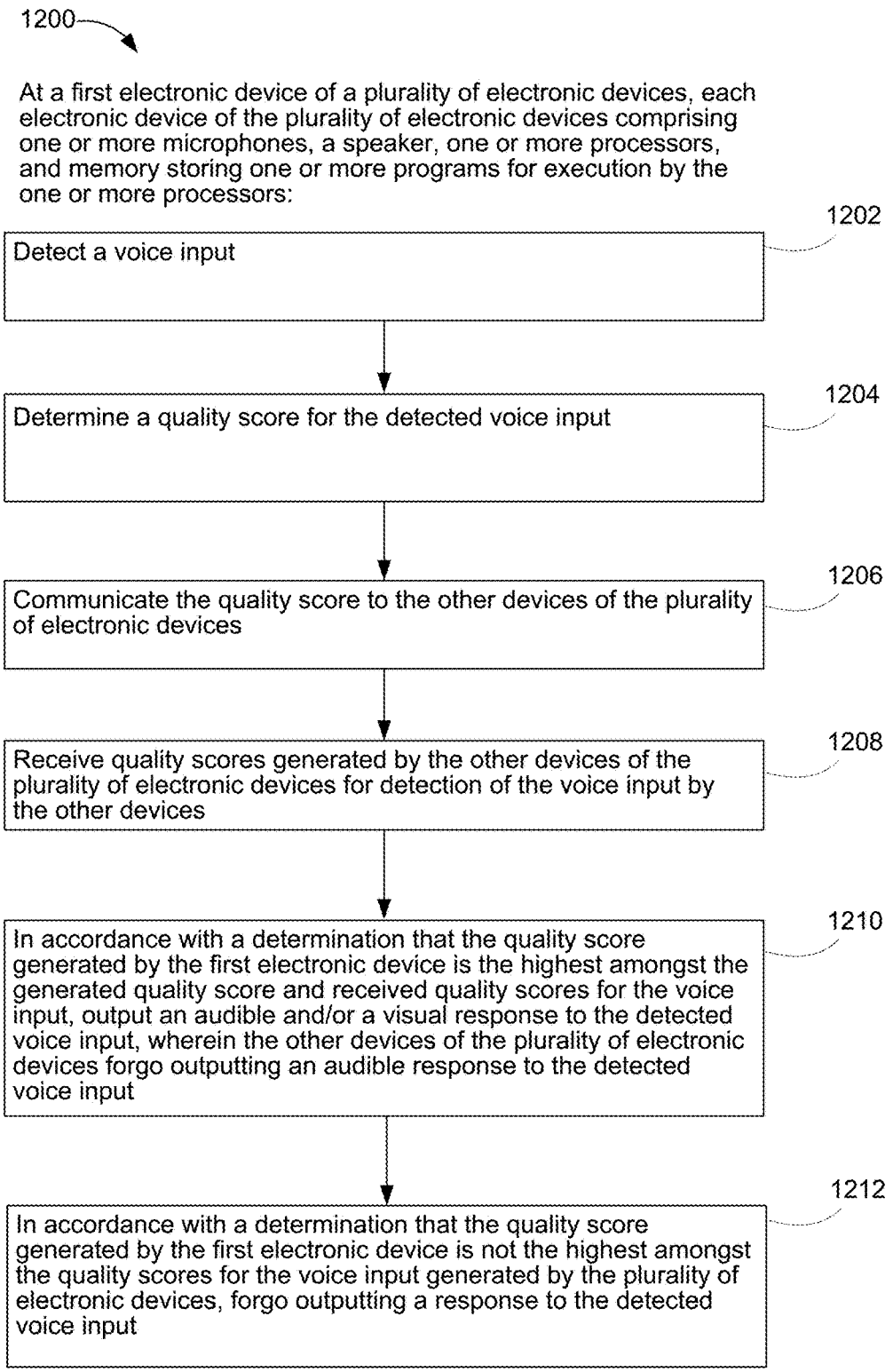
FIG. 6 is a flow diagram illustrating a method of negotiating device leadership among multiple voice interface devices in accordance with some implementations.

FIG. 6 is a flow diagram illustrating a method 1200 of negotiating device leadership among multiple voice interface devices, in accordance with some implementations. The method 1200 is implemented at an electronic device (e.g., device 1002-1, 1002-2, or 1002-3) of two or more electronic devices 190 (electronic devices 1002), where each of the two or more electronic devices includes one or more microphones, a speaker, one or more processors and memory storing one or more programs for execution by the one or more processors.

The electronic device 190 detects (1202) a voice input. The electronic device 190 captures and records a sample of the voice input from a user via the microphone 516.

The electronic device 190 determines (1204) a quality score for the detected voice input. The electronic device 190 determines a score, rating, or some other measure of the quality of the captured voice input sample. The quality of the sample may be affected by multiple factors, including the user's distance from the device, the volume at which the user spoke the voice input, the surrounding environment and noise, the capabilities of the device, and so on. In some implementations, criteria for evaluating the quality of a voice sample include, for example, loudness or amplitude of the sample, presence or absence of noise (e.g., cross-talk, hissing) and corresponding level, presence or absence of distortion (e.g., echo) and corresponding level, frequency profile of the sample, and so forth.

The electronic device 190 communicates (1206) the quality score to the other devices of the plurality of electronic devices, and receives (1208) quality scores generated by the other devices of the plurality of electronic devices for detection of the voice input by the other devices. The electronic device 190 transmits the score for its voice input sample to the other devices of the plurality of electronic devices, and receives scores from the other devices for their respective samples of the voice input.

In accordance with a determination that the quality score generated by the first electronic device is the highest amongst the generated quality score and received quality scores for the voice input, the electronic device outputs (1210) an audible response and/or a visual response (e.g., a notification or a LED light pattern) to the detected voice input, and the other devices of the plurality of electronic devices forgo outputting an audible response to the detected voice input. In some implementations, the device with the highest score (or more generally, the best score) amongst the devices with respect to the voice input optionally pre-processes its respective voice input sample, and transmits the voice input sample or the pre-processed voice input sample to the voice assistance server 112, which generates a response, which includes audible output (e.g., voice confirmation of the user request, reading out of the user-requested information), to the voice input and transmits the response to the devices. Alternatively, the device with the highest score generates the response to the voice input. In either situation, the device with the highest score (e.g., device 1002-1) outputs the response, and the other devices (e.g., devices 1002-2 and 1002-3), which have the lower scores, do not output the response. In some implementations, the electronic device that is the leader (e.g., the device with the highest score in the example here) also is the leader with respect to processing or pre-processing subsequent voice inputs from the user.

In accordance with a determination that the quality score generated by the first electronic device is not the highest amongst the quality scores for the voice input generated by the plurality of electronic devices, the electronic device 190 forgoes outputting a response to the detected voice input. If a device determines that its score is not the highest amongst the devices with respect to the voice input (e.g., devices 1002-2 and 1002-3), the device does not output a response to the voice input. For example, the devices with the lower scores power down their speakers 520. In some implementations, the devices with the lower scores also power down their microphones 516 so that just the device with the highest score is detecting further voice inputs. In some implementations, in accordance with the determination that the quality score generated by the first electronic device is not the highest amongst the quality scores for the voice input generated by the plurality of electronic devices, the electronic device 190 forgoes outputting an audible response to the detected voice input, and may output a visual response (e.g., a visual indication that the device was not determined to be the leader).

In some implementations, the plurality of electronic devices is communicatively coupled through a local network, and the communicating and receiving are performed through the local network. The electronic devices 190 are communicatively coupled through a local network (e.g., local network 104), and may transmit their scores to each other through the local network. For example, a device may multi-cast or broadcast its score through the local network.

If at least one of the devices is not on the local network, then the devices may transmit their scores to the voice assistance server 112. In some implementations, the device leadership moderator module 780 transmits the received scores to the devices, and the devices determine whether their respective scores are the highest. In some implementations, the device leadership moderator module determines which score is the highest and transmits a result of the determination to the devices. In some implementations, a hub device may include a module similar to the device leadership moderator module 780 and serve in a similar role.

In some implementations, the quality score includes a confidence level of detection of the voice input; the quality score is a confidence level value for the voice input sample. In some implementations, the quality score includes a signal-to-noise rating of detection of the voice input; the quality score is a signal-to-noise rating or value (e.g., signal-to-noise ratio) for the voice input sample.

In some implementations, the electronic device 190 recognizes a command in the voice input, and in accordance with a determination that a type of the command is related to the first electronic device, outputs an audible and/or a visual response to the detected voice input. If the command or request in the voice input is recognized as one with particular relevance to a device of the multiple devices that detected the voice input, then that device outputs a response to the voice input and the other devices forgo outputting the response, even if the device to which the command has particular relevance does not have the highest score among the devices with respect to the voice input. Examples of commands or requests that have particular relevance include video playback requests (e.g., for cast or TV devices) and music playback requests (e.g., for audio systems or speaker systems). Additionally, a command or request may have particular relevance to a device if the command or request identifies the particular device that the user wishes to fulfill the request (e.g., the command "Play video on my bedroom TV" has particular relevance to the TV device in the bedroom because the command explicitly identifies that device), or the command/request includes a device state parameter that is applicable to the current state of the device (e.g., a "screen off" command is relevant to a device whose screen is on and not relevant to a device without a screen or whose screen is off).

In this way, the multiple devices capture respective samples of the voice input, and a determination as to which sample is best is made. Based on this determination, one of the devices respond to the voice input and further voice inputs from the user. In some implementations, the multiple devices repeat the process described above for each voice input or at intervals of a predefined number of voice inputs (e.g., determine the leader again at every 5th voice input or at every 10th voice input).

In some implementations, the multiple devices detect the voice input and send their captured voice input samples to the voice assistance server 112. The voice assistance server 112 aggregates the samples or selects the best quality sample for processing or compares the samples to get the best parts of each. In some implementations, when the multiple devices are receiving and detecting the voice input, the devices each display a visual indication (e.g., a predefined LED pattern) that it is listening to the user.

Example Process for Noise Mitigation

Figure 7:
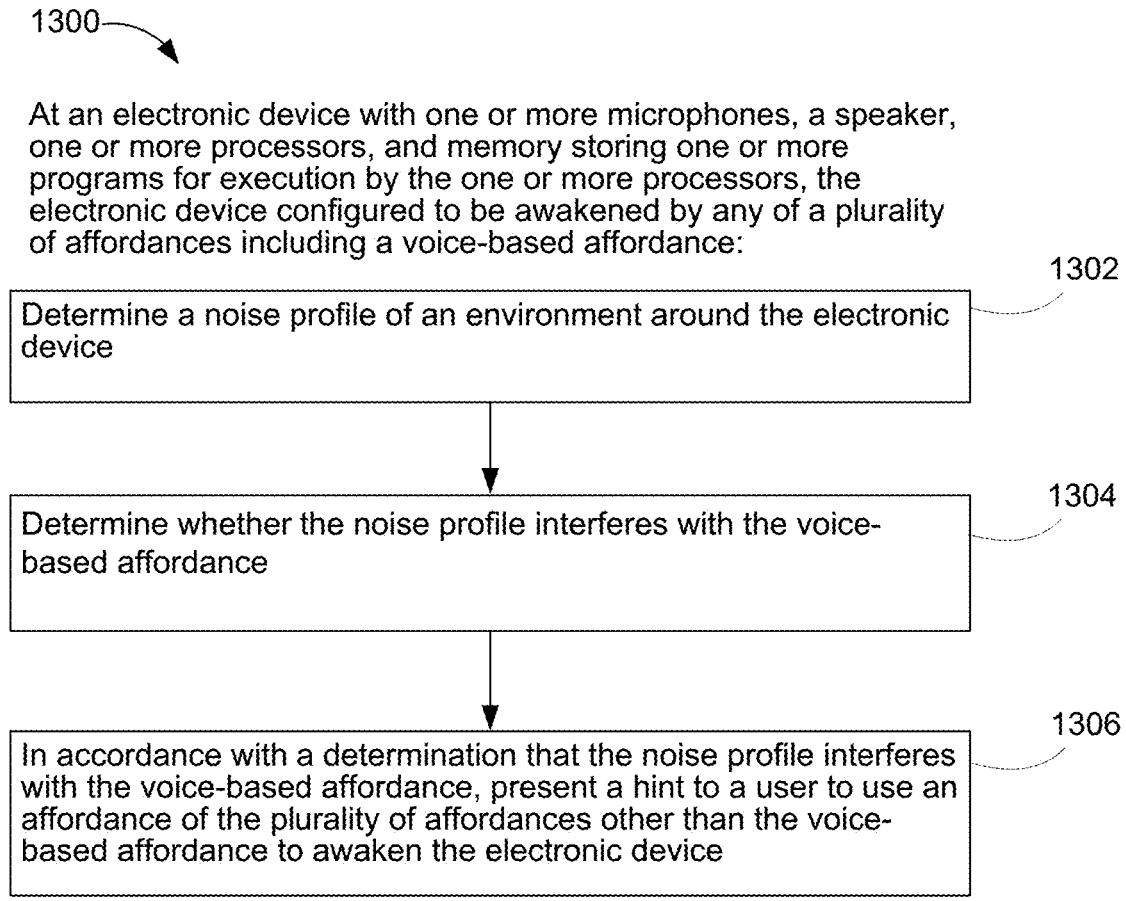
FIG. 7 is a flow diagram illustrating a method of mitigating noise around a voice interface device in accordance with some implementations.

FIG. 7 is a flow diagram illustrating a method 1300 of mitigating noise around a voice interface device in accordance with some implementations. The method 1300 is implemented at an electronic device 190 with one or more microphones, a speaker, one or more processors and memory storing one or more programs for execution by the one or more processors. The electronic device 190 is configured to be awaked by any of a plurality of affordances, including a voice-based affordance (e.g., a voice input that includes a hotword).

The electronic device determines (1302) a current noise profile of an environment around the electronic device. The electronic device 190, while it is idle, may run the noise module 558 (e.g., noise determination module 572) to determine a noise profile for its surroundings. In some implementations, determining the current noise profile includes determining a noise level (e.g., volume) of the noise, and capturing and processing the ambient noise. The processing may include, for example, determining frequencies and other parameters of the ambient noise.

The electronic device determines (1304) whether the noise profile interferes with the voice-based affordance. The electronic device 190 compares the determined noise profile with noise profiles in the noise profile store 576 and evaluates the parameters of the noise profile to determine if the noise profile (i.e., the current noise surrounding the electronic device 190) interferes with the voice-based affordance.

In accordance with a determination that the noise profile interferes with the voice-based affordance, the electronic device 190 presents (1306) a hint to a user to use an affordance of the plurality of affordances other than the voice-based affordance to awaken the electronic device. The hint directs the user to use another affordance other than the voice-based affordance to awaken the electronic device 190. In some implementations, the hint is also or otherwise includes indication that the surrounding noise interferes with hotword recognition. For example, the electronic device 190 may display a predefined pattern on the LEDs 522 that indicates surrounding noise interference with the voice-based affordance and hints to the user that the user should use another affordance to wake up the device (e.g., pressing a button 512, touching a touch sensor array 514, use another device communicatively coupled to the electronic device 190, such as a smartphone). The indication/hint may be displayed on the display 524 or output as sounds or tones through speaker 520.

In some implementations, wherein the voice-based affordance includes a spoken hotword. The voice-based affordance includes the user speaking the hotword to awaken the electronic device 190, as described above.

In some implementations, determining whether the noise profile interferes with the voice-based affordance includes determining whether the noise profile negatively affects recognition of the hotword in voice inputs detected by the electronic device. The electronic device 190 determines if the surrounding noise (represented by the noise profile) would negatively affect detection/recognition of the hotword by the electronic device 190 (e.g., is the noise sufficiently loud to drown out the user's voice input with the hotword, does the noise have a frequency profile that would interfere with the user's voice input with the hotword, would the noise distort the user's voice input with the hotword).

In some implementations, determining whether the noise profile negatively affects recognition of the hotword in voice inputs includes comparing the noise profile to a noise level threshold of a hotword recognition process associated with the electronic device. The recognition analysis module 568 of the electronic device 190 (or the voice assistance server 112) analyzes the hotword recognition module 562 of the electronic device 190 (e.g., when the electronic device 190 is idle) to determine noise thresholds at which noise would cause problems for the algorithm or process used by the module. These thresholds are saved and may be compared to current noise profiles to determine if the current noise profile would pose a problem for the hotword recognition module 562. The analysis of the hotword recognition module is with respect to the electronic device 190, and thus the threshold may be different between devices.

In some implementations, determining whether the noise profile negatively affects recognition of the hotword in voice inputs includes comparing the noise profile to a voice volume level threshold, where the voice volume level threshold is defined based on a predefined distance from the electronic device. The user volume threshold module 570 of the electronic device 190 (or the voice assistance server 112) performs analyses of the user's voice inputs to determine a maximum comfortable volume level at which the user will speak voice inputs, with the determination based on a predefined distance (e.g., a predefined distance that is based on a "typical user distance" beyond which voice inputs attenuate).

In some implementations, determining whether the noise profile negatively affects recognition of the hotword in voice inputs includes comparing the noise profile to a predetermined set of noise profiles associated with the electronic device, wherein the noise profiles of the predetermined set of noise profiles are known to negatively affect recognition of the hotword by the electronic device in voice inputs. The electronic device 190 compares the noise profiles to previous noise profiles (e.g., in noise profiles store 576) that interfered with hotword detection.

In some implementations, the electronic device includes a button, and the affordance of the plurality of affordances other than the voice-based affordance includes activating the button. The electronic device 190 includes a physical push button 512 and the user can awaken the device by activating the button 512 in lieu of speaking a voice input with the hotword.

In some implementations, presenting a hint to a user to use an affordance of the plurality of affordances other than the voice-based affordance to awaken the electronic device includes illuminating the button on the electronic device corresponding to a button-based affordance of the plurality of affordances. The button 512 may include lighting (e.g., an embedded LED light), and the electronic device 190 may hint the user to use the button 512 instead of speaking the hotword by lighting up the button 512.

In some implementations, presenting a hint to a user to use an affordance of the plurality of affordances other than the voice-based affordance to awaken the electronic device includes outputting a predefined audible sound. The electronic device 190 may hint to the user to use an alternate affordance by outputting a predefined sound or tone (or set of sounds or tones) through the speaker 520.

In some implementations, the electronic device includes a display, and presenting a hint to a user to use an affordance of the plurality of affordances other than the voice-based affordance to awaken the electronic device includes displaying the hint on a display. The electronic device 190 may hint to the user to use an alternate affordance by displaying a hint message on the display 524.

In some implementations, the electronic device includes one or more LED lights, and presenting a hint to a user to use an affordance of the plurality of affordances different from the voice-based affordance to awaken the electronic device includes displaying the hint using the one or more LED lights. The electronic device 190 may hint to the user to use an alternate affordance by displaying a predefined light pattern on the LEDs 522.

Figure 8B:
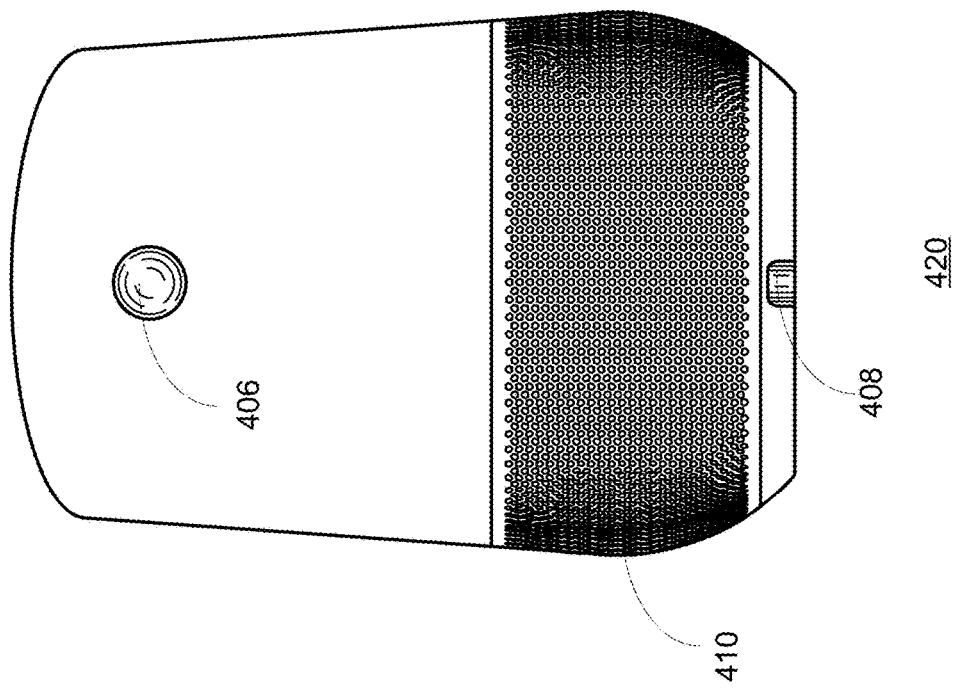
FIGS. 8A and 8B are a front view and a rear view of a voice-activated electronic device in accordance with some implementations.
Figure 8A:
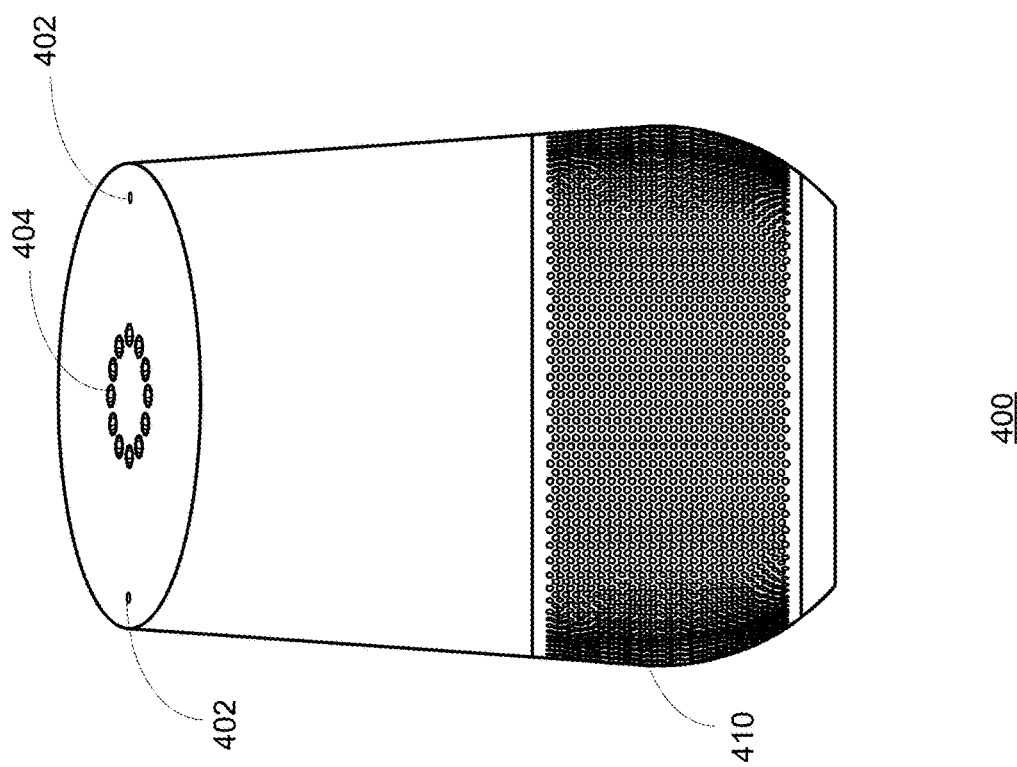

FIGS. 8A and 8B are a front view 400 and a rear view 420 of a voice-activated electronic device 190 in accordance with some implementations. The electronic device 190 is designed as warm and inviting, and fits naturally in many areas of a home. The electronic device 190 includes one or more microphones 402 and an array of full color LEDs 404. The full color LEDs 404 could be hidden under a top surface of the electronic device 190 and invisible to the user when they are not lit. In some implementations, the array of full color LEDs 404 is physically arranged in a ring. Further, the rear side of the electronic device 190 optionally includes a power supply connector 408 configured to couple to a power supply.

In some implementations, the electronic device 190 presents a clean look having no visible button, and the interaction with the electronic device 190 is based on voice and touch gestures. Alternatively, in some implementations, the electronic device 190 includes a limited number of physical buttons (e.g., a button 406 on its rear side), and the interaction with the electronic device 190 is further based on press on the button in addition to the voice and touch gestures.

In some implementations, given simplicity and low cost of the electronic device 190, the electronic device 190 includes an array of full color light emitting diodes (LEDs) rather than a full display screen. A LED design language is adopted to configure illumination of the array of full color LEDs and enable different visual patterns indicating different voice processing state of the electronic device 190. The LED Design Language consists of a grammar of colors, patterns, and specific motion applied to a fixed set of full color LEDs. The elements in the language are combined to visually indicate specific device states during the use of the electronic device 190. In some implementations, illumination of the full color LEDs aims to clearly delineate the passive listening and active listening states of the electronic device 190 among other important states. Placement of the full color LEDs complies with physical constraints of the electronic device 190, and the array of full color LEDs could be used in a speaker that is made by a third party original equipment manufacturer (OEM) based on specific technology (e.g., Google Assistant).

When the array of full color LEDs is used in a speaker that is made by a third party OEM based on specific technology, the full color LEDs and the LED design language are configured to fit a corresponding physical user interface of the OEM speaker. In this situation, device states of the OEM speaker remain the same, while specific visual patterns representing the device states could be varied (for example, the colors of the full color LEDs could be different but are displayed with similar animation effects).

In a voice-activated electronic device 190, passive listening occurs when the electronic device 190 processes audio inputs collected from its surrounding environment but does not store the audio inputs or transmit the audio inputs to any remote server. In contrast, active listening occurs when the electronic device 190 stores the audio inputs collected from its surrounding environment and/or shares the audio inputs with a remote server. In accordance with some implementations of this application, the electronic device 190 only passively listens to the audio inputs in its surrounding environment without breaching privacy of users of the electronic device 190.

Figure 8C:
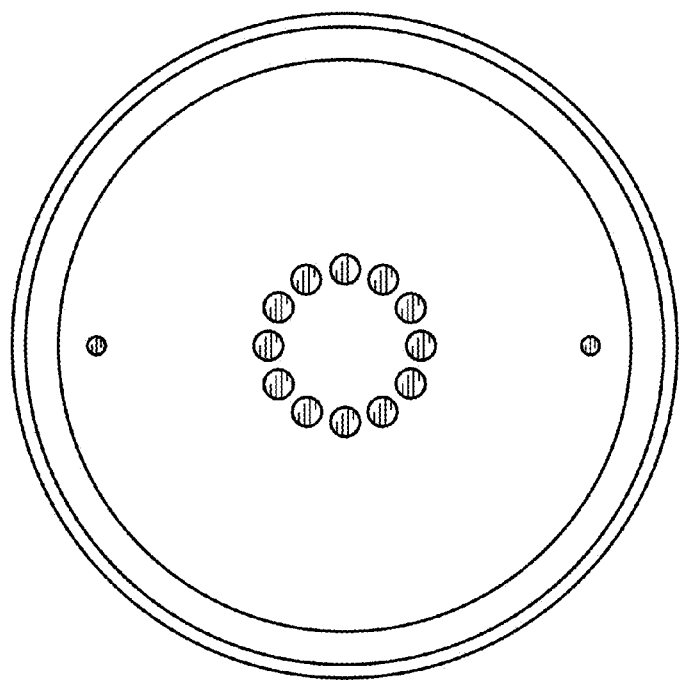
FIG. 8C is a top view of a voice-activated electronic device in accordance with some implementations.
Figure 8D:
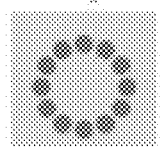
FIG. 8D shows six visual patterns displayed by an array of full color LEDs for indicating voice processing states in accordance with some implementations.
Figure 8D:
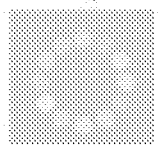
Figure 8D:
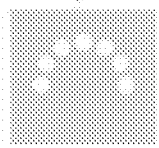
Figure 8D:
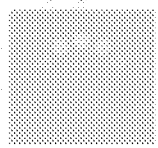
Figure 8D:
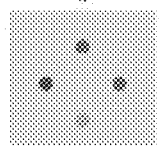
Figure 8D:
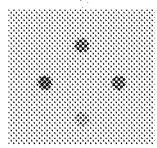
Figure 8D:
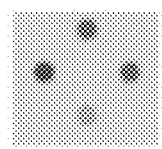
Figure 8D:
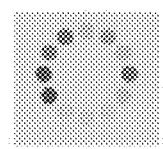
Figure 8D:
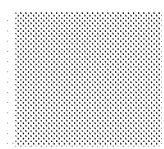
Figure 8D:
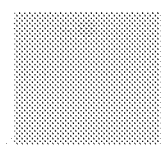
Figure 8D:
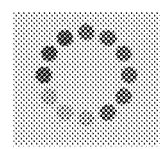

FIG. 8C is a top view of a voice-activated electronic device 190 in accordance with some implementations, and FIG. 8D shows six visual patterns displayed by an array of full color LEDs for indicating voice processing states in accordance with some implementations. In some implementations, the electronic device 190 does not include any display screen, and the full color LEDs provide a simple and low cost visual user interface compared with the a full display screen. The full color LEDs could be hidden under a top surface of the electronic device and invisible to the user when they are not lit. Referring to FIGS. 8C and 8D, in some implementations, the array of full color LEDs are physically arranged in a ring.

Reference has been made in detail to implementations, examples of which are illustrated in the accompanying drawings. In the detailed description above, numerous specific details have been set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first device could be termed a second device, and, similarly, a second device could be termed a first device, without departing from the scope of the various described implementations. The first device and the second device are both types of devices, but they are not the same device.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising,"

when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method, comprising:
    at a first electronic device of a plurality of electronic devices, each electronic device of the plurality of electronic devices comprising one or more microphones, a speaker, one or more processors, and memory storing one or more programs for execution by the one or more processors:
        detecting a voice input;
        determining a quality score for the detected voice input;
        communicating the quality score to the other devices of the plurality of electronic devices;
        receiving quality scores generated by the other devices of the plurality of electronic devices for detection of the voice input by the other devices;
        in accordance with a determination that the quality score generated by the first electronic device is the highest amongst the generated quality score and received quality scores for the voice input, outputting an audible and/or a visual response to the detected voice input, wherein the other devices of the plurality of electronic devices forgo outputting an audible response to the detected voice input; and
        in accordance with a determination that the quality score generated by the first electronic device is not the highest amongst the quality scores for the voice input generated by the plurality of electronic devices, forgoing outputting a response to the detected voice input.

2. The method of claim 1, wherein the plurality of electronic devices is communicatively coupled through a local network; and
    the communicating and receiving are performed through the local network.

3. The method of claim 1, wherein the quality score comprises a confidence level of detection of the voice input.

4. The method of claim 1, wherein the quality score comprises a signal-to-noise rating of detection of the voice input.

5. The method of claim 1, further comprising:
    recognizing a command in the voice input; and
    in accordance with a determination that a type of the command is related to the first electronic device, outputting an audible and/or a visual response to the detected voice input.

6. A first electronic device of a plurality of electronic devices, each of the plurality of electronic devices comprising:
    one or more microphones;
    a speaker;
    one or more processors; and
    memory storing one or more programs to be executed by the one or more processors, the one or more programs comprising instructions for:
        detecting a voice input;
        determining a quality score for the detected voice input;
        communicating the quality score to the other devices of the plurality of electronic devices;
        receiving quality scores generated by the other devices of the plurality of electronic devices for detection of the voice input by the other devices;
        in accordance with a determination that the quality score generated by the first electronic device is the highest amongst the generated quality score and received quality scores for the voice input, outputting an audible and/or a visual response to the detected voice input, wherein the other devices of the plurality of electronic devices forgo outputting an audible response to the detected voice input; and
        in accordance with a determination that the quality score generated by the first electronic device is not the highest amongst the quality scores for the voice input generated by the plurality of electronic devices, forgoing outputting a response to the detected voice input.

7. The device of claim 6, wherein the plurality of electronic devices is communicatively coupled through a local network; and
    the communicating and receiving are performed through the local network.

8. The device of claim 6, wherein the quality score comprises a confidence level of detection of the voice input.

9. The device of claim 6, wherein the quality score comprises a signal-to-noise rating of detection of the voice input.

10. The device of claim 6, further comprising instructions for:
recognizing a command in the voice input; and
in accordance with a determination that a type of the command is related to the first electronic device, outputting an audible and/or a visual response to the detected voice input.

11. A non-transitory computer readable storage medium storing one or more programs, the one or more programs comprising instructions, which, when executed by a first electronic device of a plurality of electronic devices, each of the plurality of electronic devices comprising one or more microphones, a speaker, and one or more processors, cause the electronic device to perform operations comprising:
detecting a voice input;
determining a quality score for the detected voice input;
communicating the quality score to the other devices of the plurality of electronic devices;
receiving quality scores generated by the other devices of the plurality of electronic devices for detection of the voice input by the other devices;
in accordance with a determination that the quality score generated by the first electronic device is the highest amongst the generated quality score and received quality scores for the voice input, outputting an audible and/or a visual response to the detected voice input, wherein the other devices of the plurality of electronic devices forgo outputting an audible response to the detected voice input; and
in accordance with a determination that the quality score generated by the first electronic device is not the highest amongst the quality scores for the voice input generated by the plurality of electronic devices, forgoing outputting a response to the detected voice input.

12. The computer readable storage medium of claim 11, wherein the plurality of electronic devices is communicatively coupled through a local network; and
the communicating and receiving are performed through the local network.

13. The computer readable storage medium of claim 11, wherein the quality score comprises a confidence level of detection of the voice input.

14. The computer readable storage medium of claim 11, wherein the quality score comprises a signal-to-noise rating of detection of the voice input.

15. The computer readable storage medium of claim 11, further comprising instructions which, when executed by the electronic device, cause the electronic device to perform operations comprising:
recognizing a command in the voice input; and
in accordance with a determination that a type of the command is related to the first electronic device, outputting an audible and/or a visual response to the detected voice input.

* * * * *

(12) INTER PARTES REVIEW CERTIFICATE (3607th)

United States Patent
Casado et al.

(10) Number: US 9,812,128 K1
(45) Certificate Issued: Jun. 10, 2024

(54) DEVICE LEADERSHIP NEGOTIATION AMONG VOICE INTERFACE DEVICES

(71) Applicants: Diego Melendo Casado; Terry Tai; Matthew Nirvan Sharifi; Kenneth Mixter; Alexander Houston Gruenstein; Christopher Thaddeus Hughes

(72) Inventors: Diego Melendo Casado; Terry Tai; Matthew Nirvan Sharifi; Kenneth Mixter; Alexander Houston Gruenstein; Christopher Thaddeus Hughes

(73) Assignee: GOOGLE LLC

Trial Number:

IPR2022-01594 filed Sep. 29, 2022

Inter Partes Review Certificate for:

Patent No.: 9,812,128
Issued: Nov. 7, 2017
Appl. No.: 15/284,483
Filed: Oct. 3, 2016

The results of IPR2022-01594 are reflected in this inter partes review certificate under 35 U.S.C. 318(b).

INTER PARTES REVIEW CERTIFICATE
U.S. Patent 9,812,128 K1
Trial No. IPR2022-01594
Certificate Issued Jun. 10, 2024

AS A RESULT OF THE INTER PARTES REVIEW PROCEEDING, IT HAS BEEN DETERMINED THAT:

Claims 1-3, 5-8, 10-13 and 15 are cancelled.

\* \* \* \* \*